United States Patent
Palm et al.

[11] Patent Number: 5,815,199
[45] Date of Patent: Sep. 29, 1998

[54] INTERPHONE WITH TELEVISION

[75] Inventors: Stephen Ray Palm; Satoshi Furukawa; Kenichi Hagio, all of Kadoma, Japan

[73] Assignee: Matsushita Electric Works, Ltd., Osaka, Japan

[21] Appl. No.: 592,442

[22] Filed: Jan. 26, 1996

Related U.S. Application Data

[63] Continuation-in-part of Ser. No. 151,776, Nov. 15, 1993, abandoned, which is a continuation-in-part of Ser. No. 827,988, Jan. 29, 1992, abandoned.

[30] Foreign Application Priority Data

Jan. 31, 1991 [JP] Japan .................................. 3-010695
Jul. 31, 1991 [JP] Japan .................................. 3-191730

[51] Int. Cl.⁶ ...................................................... H04N 7/18
[52] U.S. Cl. .......................... 348/143; 348/151; 348/152; 348/156; 348/580; 348/581
[58] Field of Search ..................................... 348/580, 581, 348/156, 36, 143, 144, 147, 149, 150, 151, 153, 20, 13, 582; 382/393

[56] References Cited

U.S. PATENT DOCUMENTS

| | | | |
|---|---|---|---|
| H997 | 11/1991 | Bronson | 364/521 |
| 4,258,387 | 3/1981 | Lemelson | 348/15 |
| 4,355,329 | 10/1982 | Yoshida et al. | 358/108 |
| 4,400,725 | 8/1983 | Tanigaki | 348/17 |
| 4,524,384 | 6/1985 | Zefkowitz | 348/38 |
| 4,549,208 | 10/1985 | Kamejima et al. | 348/37 |
| 4,563,700 | 1/1986 | Sato | 348/240 |
| 4,703,347 | 10/1987 | Yasuda et al. | 348/20 |
| 4,740,839 | 4/1988 | Phillips | 348/17 |
| 4,790,028 | 12/1988 | Ramage | 348/580 |
| 4,843,461 | 6/1989 | Tatsumi | 348/580 |
| 4,908,705 | 3/1990 | Wight | 348/580 |
| 4,953,196 | 8/1990 | Ishikawa et al. | 358/85 |
| 4,996,592 | 2/1991 | Yoshida | 358/85 |
| 4,996,594 | 2/1991 | Muroyama | 358/85 |
| 5,008,752 | 4/1991 | Van Nostrand | 348/581 |
| 5,023,719 | 6/1991 | Zwirn | 358/108 |
| 5,032,820 | 7/1991 | Tanikawa et al. | 358/108 |
| 5,067,019 | 11/1991 | Juday et al. | 348/248 |
| 5,068,735 | 11/1991 | Tuchiya et al. | 348/580 |
| 5,103,306 | 4/1992 | Weiman et al. | 348/580 |
| 5,107,113 | 4/1992 | Robinson | 348/16 |
| 5,107,254 | 4/1992 | Choi | 358/180 |
| 5,111,291 | 5/1992 | Erickson et al. | 358/108 |
| 5,185,667 | 2/1993 | Zimmermann | 348/38 |
| 5,187,574 | 2/1993 | Kosemura et al. | 348/17 |
| 5,200,818 | 4/1993 | Neta et al. | 348/36 |
| 5,489,940 | 2/1996 | Richardson et al. | 348/15 |
| 5,508,734 | 4/1996 | Baker et al. | 348/36 |
| 5,528,194 | 6/1996 | Ohtani et al. | 382/393 |

FOREIGN PATENT DOCUMENTS 2114786  4/1990  Japan .

*Primary Examiner*—Tommy P. Chin
*Assistant Examiner*—Anand Rao

[57] ABSTRACT

An interphone with television includes a terminal device having a wide-angle image input camera, an image output circuit, and a master device for receiving an image signal from the image output circuit. The master device converts the image to a digital format and stores the image signal in an image memory. The image may be panned, magnified, and corrected using digital processing techniques. The contents of the image memory are converted to an analogue signal for reproduction on a monitor.

2 Claims, 29 Drawing Sheets

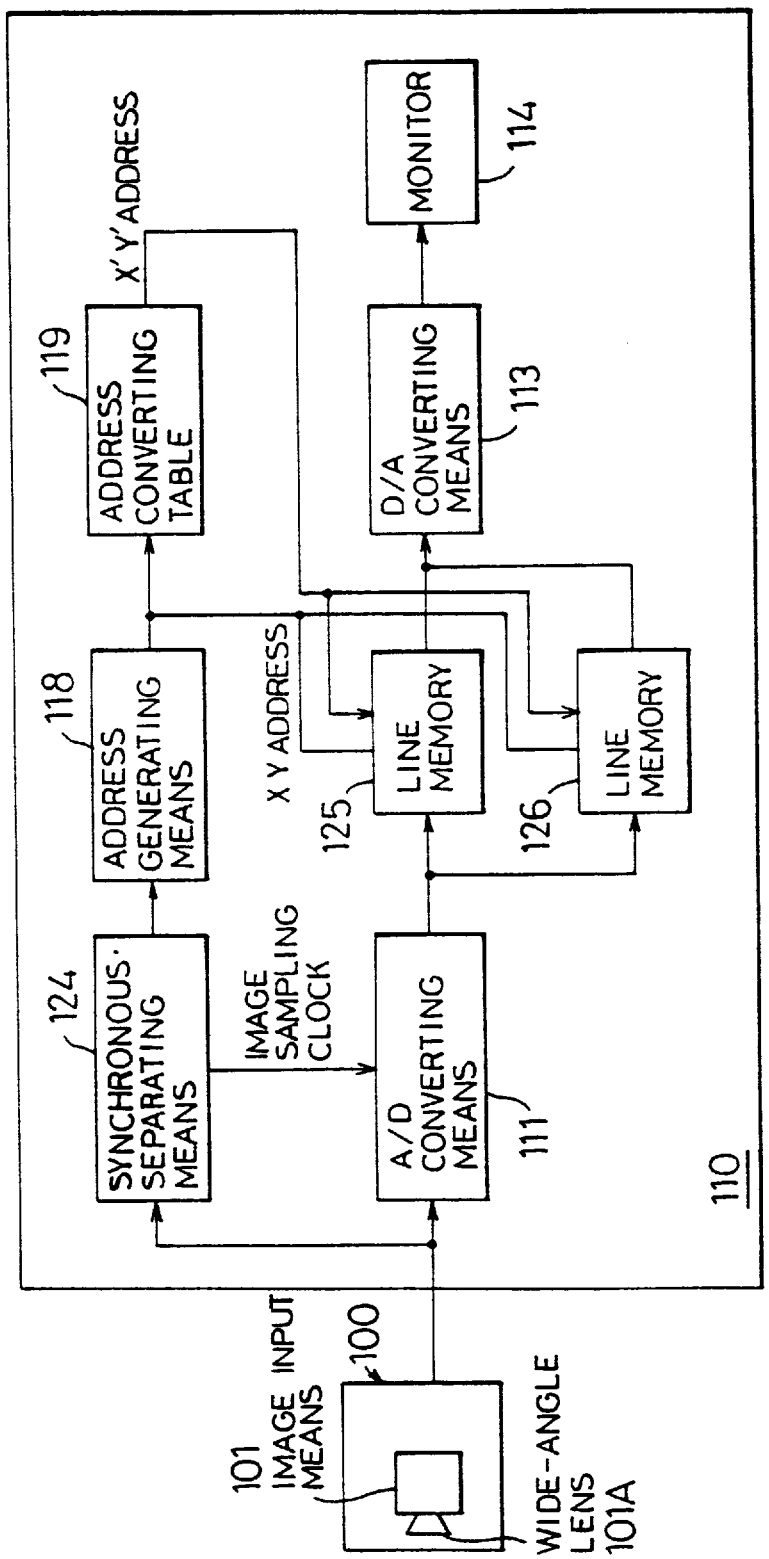

|   |    |    |    |    |    | X  |    |    |    |         |     |
|---|----|----|----|----|----|----|----|----|----|---------|-----|
|   | 42 | 43 | 44 | 45 | 46 | 46 | 47 | 48 | 48 | · · · 469 | 470 |
|   | 40 | 41 | 42 | 42 | 43 | 44 | 45 | 46 | 46 | · · · 471 | 472 |
| Y |    |    |    |    |    |    |    |    |    |         |     |
|   | 42 | 43 | 44 | 45 | 46 | 46 | 47 | 48 | 48 | · · · 469 | 470 |
|   | 40 | 41 | 42 | 42 | 43 | 44 | 45 | 46 | 46 | · · · 471 | 472 |

D(x)  D(x+1)

x+k

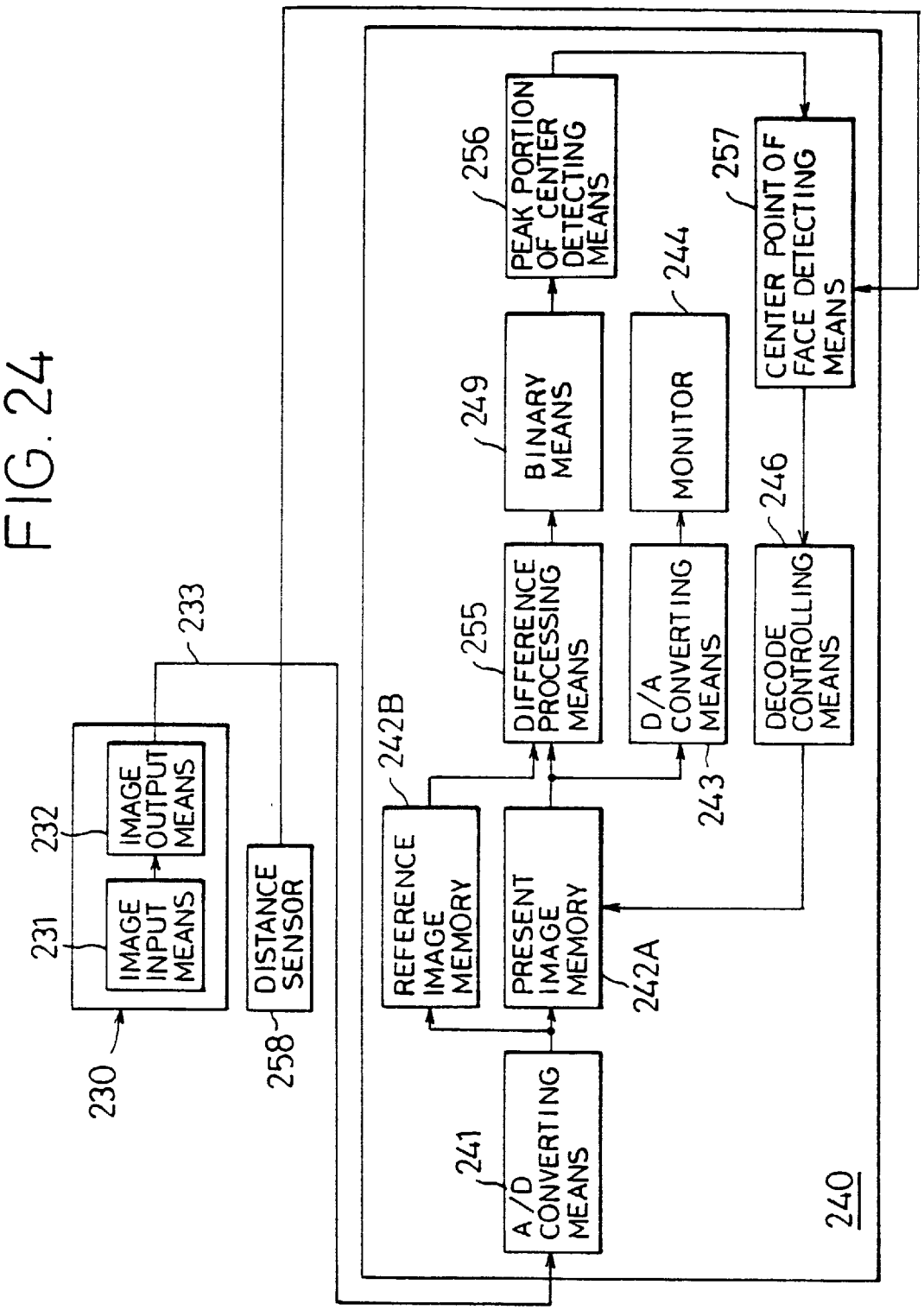

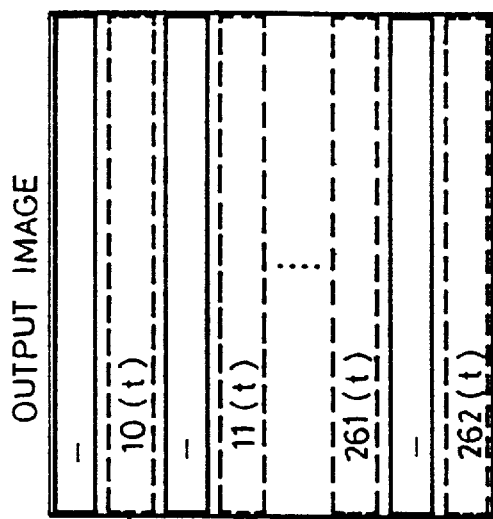
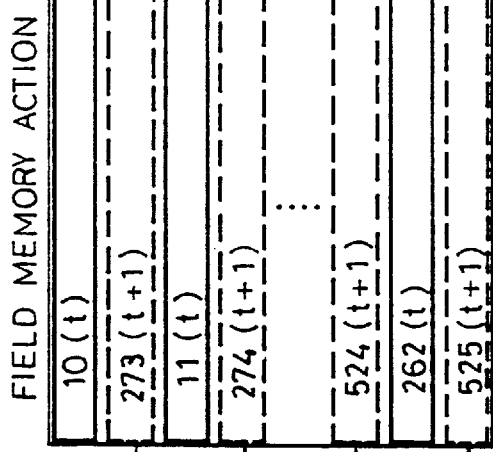
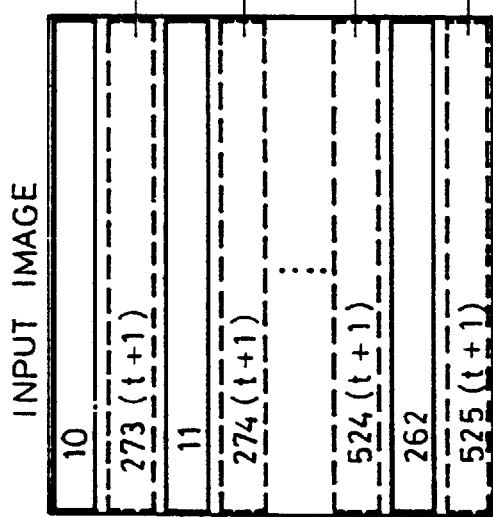
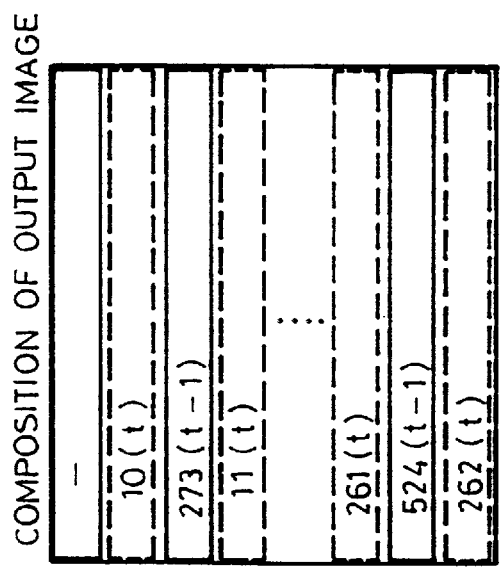

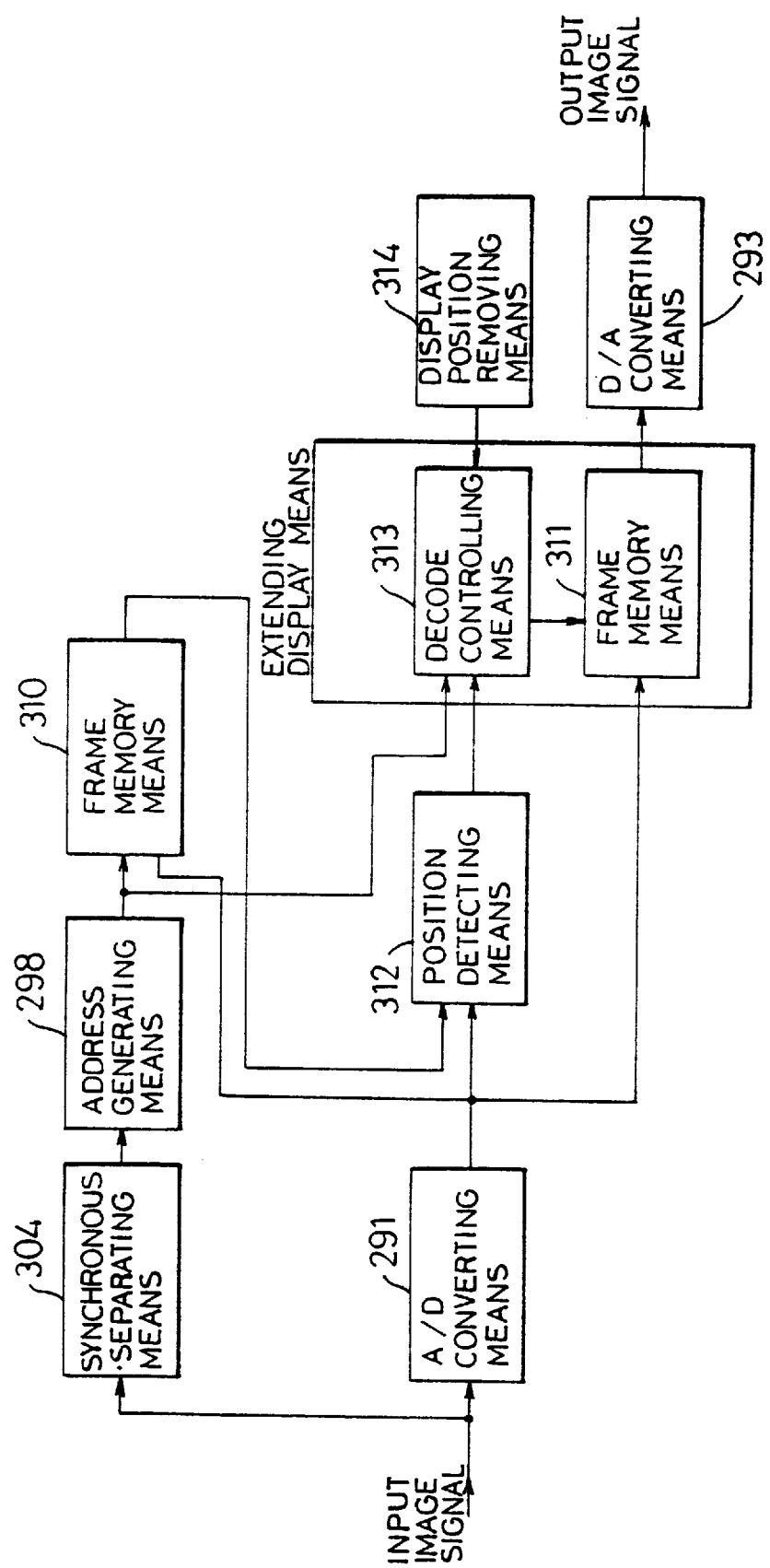

INTERPHONE WITH TELEVISION

This disclosure is a continuation-in-part of patent application Ser. No. 08/151,776, filed Nov. 15, 1993, now abandoned; which is a continuation-in-part of prior patent application Ser. No. 07/827,988, filed on Jan. 29, 1992, now abandoned.

BACKGROUND OF THE INVENTION

This invention relates generally to interphones equipped with a television and, more particularly, to an interphone with a television which allows an image of a visitor taken by a television camera at the porch, gate or the like of houses, buildings or the like to be monitored in the interior of the houses or the like.

DESCRIPTION OF RELATED ART

Conventionally, the interphone with the television generally comprises a terminal device incorporating a television camera and installed at the entrance porch, gate or the like of houses, buildings or the like, and a master device incorporating a television monitor and installed inside the house or the like so that an image of the visitor standing in front of the porch or the like place can be taken by the camera and reproduced on the monitor of the master device to be visually confirmed by the dweller. Further, the interphone is equipped with means for adjusting visible angle of the camera in accordance with the position where the visitor stands at the porch or any difference in the height between a plurality of visitors.

With the above arrangement of the interphone, however, the visible angle of the television camera has been required to be adjusted every time a new visitor stands in front of the porch or the like. This makes the operation rather complicated and require the adjusting means to be formed with high precision machines and parts, increasing manufacturing costs.

As a countermeasure, M. Higashio et al have suggested in Japanese Patent Laid-open Publication No. 2-114786 an interphone with television having an image-taking zone of the television camera set to be larger so that the image of the visitor can be taken irrespective of any difference in the position where the visitor stands or in the height of the respective visitors and a face portion in the image taken can be scrolled. This interphone, however, has difficulty maintaining a high quality image when, for example, the visitor's face portion is scrolled. This is because the image signal from an image input means is not subjected to corrective processing of distortion of the picture, leaving the problem of the precision of visual confirmation unsolved.

The term "scroll" as used above and hereinafter refers generally to moving an image on a monitor in any desired direction. For example, when an image is formed by a television camera, a restricted target area within the image displayed may be shifted on the monitor. The shifting operation may have two modes. The first mode of operation determines the target area in the whole image formed by the camera and displayed on the monitor. For example, the target area may be determined by shifting, in all directions, a frame-shaped cursor about the displayed image to identify a restricted area for operator viewing. The restricted area may, for example, include a portion of the whole image showing a face of a visitor. To select the target area containing the face, an operator preferably shifts the frame-shaped cursor to encompass the face. The second shifting operation involves shifting the target area in all directions and, more preferably, a magnified target area over the whole monitor screen to change the image monitored or the composition of the image. In one embodiment of the second mode, the magnified target area is shifted to follow the target, the face of the visitor, and/or other real-time moving image as the target moves within the view of the wide-angle image. In this embodiment, the target is always displayed in the center of the magnified image.

SUMMARY OF THE INVENTION

A primary object of the present invention is to provide an interphone with a television which is improves the image quality upon reproduction on the monitor when the visitor's face portion is scrolled by means of digital processing of the image signal from the image input means.

According to the present invention, this object can be realized by means of an interphone with television in which a relatively wide-angled image including the visitor is provided from an image input means to an image output means in a terminal device installed at the entrance porch or the like portion of a house or building, and signals indicative of such image are provided from the image output means to a monitor in a master device installed inside the house for reproducing the wide-angled image on the monitor and scrolling a portion of the visitor in the wide-angled image, characterized in that the image signals from the image output means of the terminal device are digitized in the master device by an A/D converting means to be stored in an image memory, the image signals being provided from the image memory through a D/A converting means to the monitor for being scrolled by a scroll means on the monitor.

Other objects and advantages of the present invention shall be made clear in the following description of the invention detailed with reference to the accompanying drawings.

BRIEF DESCRIPTION OF THE DRAWINGS

FIG. 9 is a block diagram showing another embodiment of the interphone according to the present invention;

FIG. 24 shows in a block diagram a further embodiment of the interphone according to the present invention;

FIGS. 29 to 31 are explanatory views for the operation of the interphone of FIG. 27; and FIG. 32 shows in a partial block diagram of a further embodiment of the interphone according to the present invention.

While the present invention shall now be described with reference to the respective embodiments shown in the accompanying drawings, it will be appreciated that the intention is not to limit the invention only to these embodiments shown but rather to include all modifications, alterations and equivalent arrangements possible within the scope of appended claims.

DETAILED DESCRIPTION OF THE PREFERRED EMBODIMENTS

Figure 1:
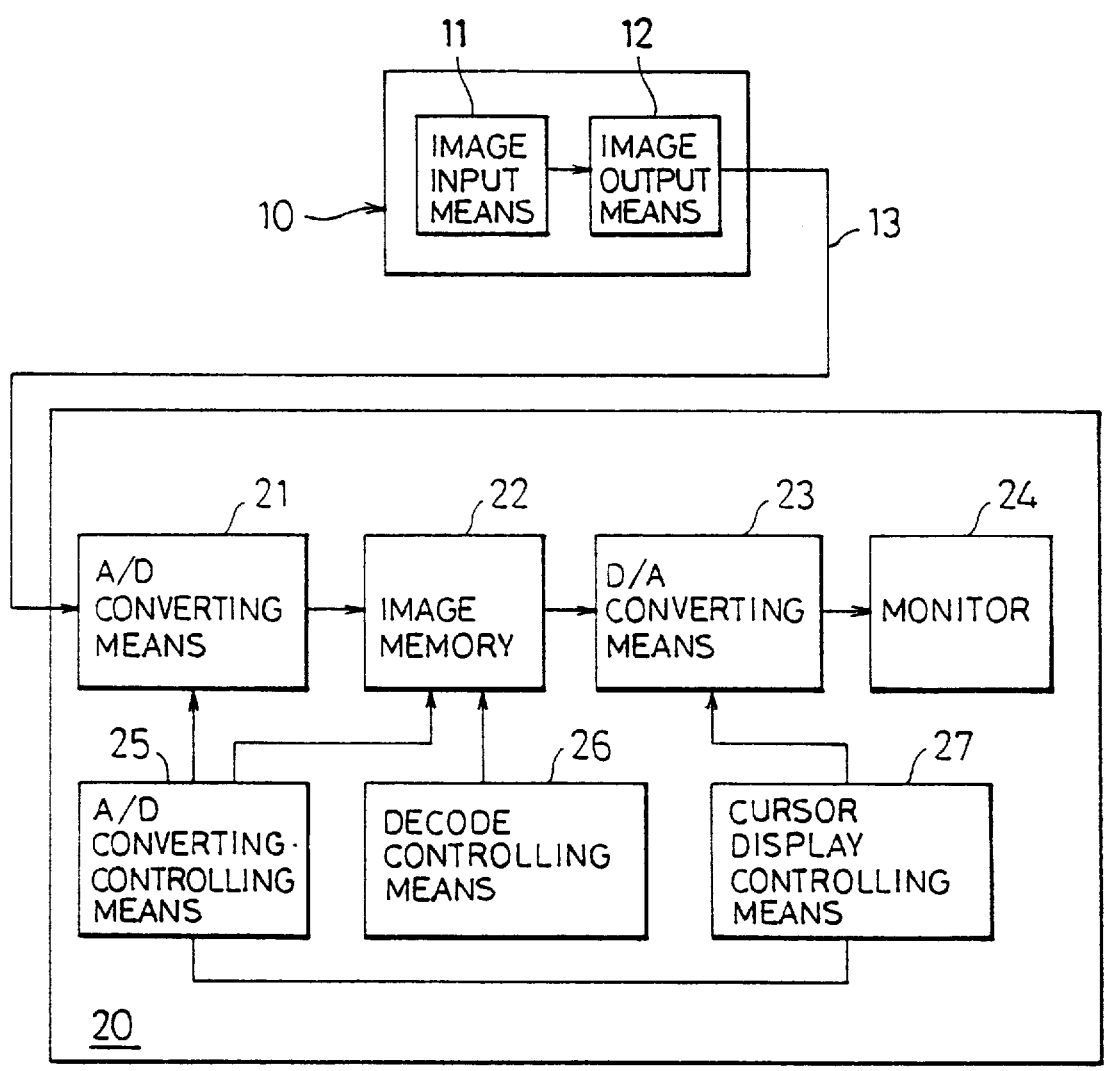
FIG. 1 shows in a block diagram an embodiment of the interphone with television according to the present invention.

Referring to FIG. 1, there is shown an embodiment of the interphone according to the present invention, in which the interphone includes a terminal device 10 to be installed outside the entrance porch, gate or the like position of general houses for providing an image signal, and a master device 20 installed inside the porch or the like house position for receiving the image signal from the terminal device 10.

The terminal device 10 comprises an image input means 11 for taking an image of the visitor at the porch or the like position, and an image output means 12 for receiving an image signal from the image input means 11 and transmitting the image signal to the master device 20. The image output means 12 is connected to the master device 20 through such simple wiring as pairs of telephone wires utilized as a transmission line 13. When a supplied power from a power source is superposed on the image signal by means of the transmission line 13, a balancing circuit may be provided with respect to the transmission line 13. Further, it is preferable to employ a CCD image device as the image input means in respect of manufacturing costs and stability. It is also desired to set an image-taking angle to be wide enough for absorbing any difference in the standing position or in the height between a plurality of visitors.

On the other hand, the master device 20 includes an A/D converting means 21 directly connected to the transmission line 13 to receive the image signal from the output means 12 of the terminal device 10, and an A/D conversion controlling means 25 for providing to the A/D converting means 21 a sampling signal in accordance with which the converting means 21 provides digital image data of, for example, 8 bits per 1 picture element. The digital image data are stored in an image memory 22 which has a memory size of, for example, 512×512 or 256×256. The digital image data stored in the image memory 22 are read out under the control of a read signal from a read or decode controlling means 26. The digital image data is converted by at a D/A converting means 23 into an analogue image signal. The analogue image signal is provided to a monitor 24 and reproduced as a monitoring image.

Figure 2:
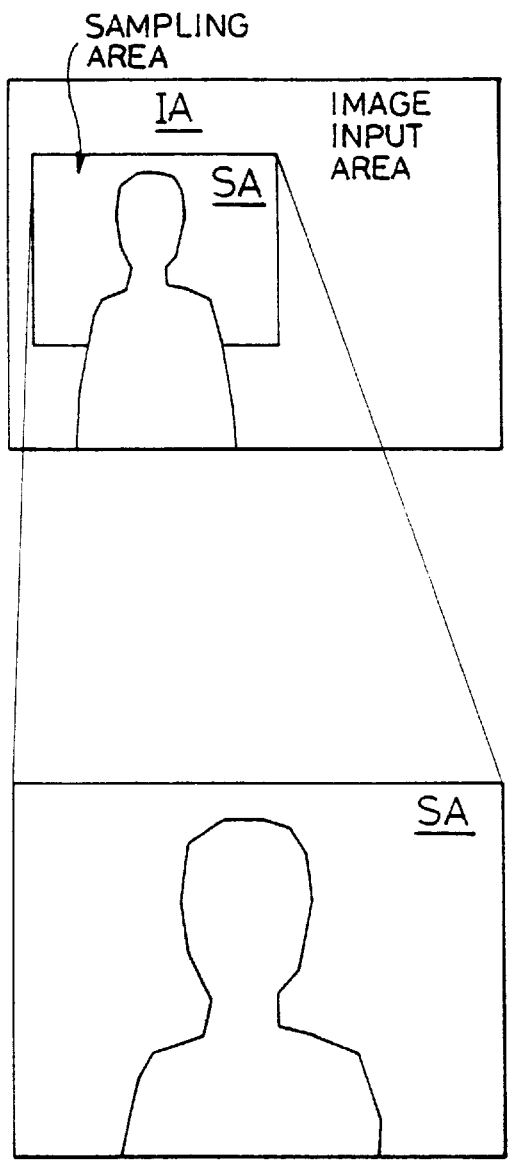
FIGS. 2 and 3 are explanatory views for the scroll operation in the interphone of FIG. 1.

The A/D conversion controlling means 25 generates a sampling pulse for the digital conversion only during a sampling zone in the image signal. The sampling zone is a fragmentary zone within an image input area IA as shown in FIG. 2. The fragmentary zone is temporarily held in the image memory 22 for creating a magnified display of an area SA denoted by a rectangular shape having the same aspect ratio as the image area IA to be reproduced on the monitor 24. The sampling area SA can be set as desired by disposing a cursor of a predetermined size at a desired position by means of a cursor display controlling means 27.

Writing of the sampling area SA into the image memory 22 is generated by the sampling pluse during the predetermined period within a vertical period on the basis of a control signal from the cursor display controlling means 27. The sampling pulse generated from the A/D conversion controlling means 25 is employed at the A/D converting means 21 as a sampling signal and also at the image memory 22 as a writing signal. Therefore, the number of the sampling pulses and the size of the image memory 22 may be made equal, for example, 256×256 in common. With this arrangement, the image memory 22 does not store the whole image. The image memory 22 only requires enough capacity for the sampling area, allowing the memory capacity to be reduced.

The decode controlling means 26, provides a read signal for reading at a next frame the digital image data of the sampling area SA stored in the image memory 22. The reading occurs with a different timing from the writing for the purpose of producing the magnified display. Generally, the image signal commonly employed has 535 scanning lines. However, the size of the image memory 22 in the vertical direction is 256 lines, which are ½ of the scanning lines, so that 1 picture is formed by reading the same contents twice. That is, in the vertical direction, the same contents are displayed over two fields of the interlace, by displaying the same contents are along two lines. Consequently, the predetermined fragmentary portion of the initial image can be displayed as magnified over the entire screen of the monitor 24 as seen in FIG. 2.

Figure 3A:
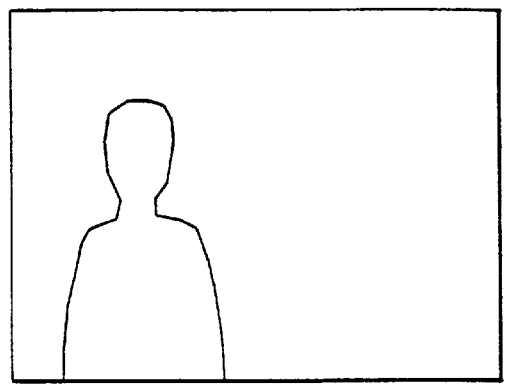
Figure 3B:
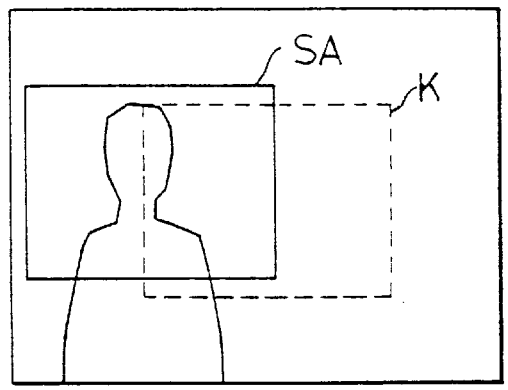
Figure 3C:
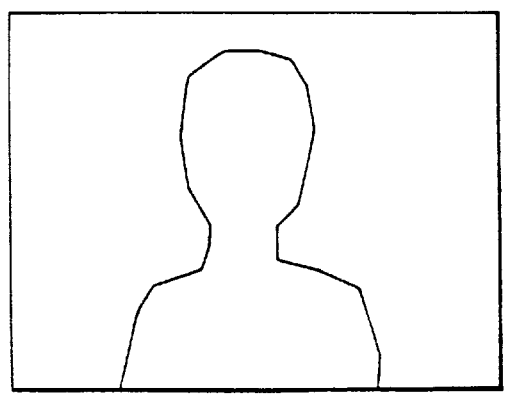

Referring next to the operational sequence of the interphone according to the present invention, an image of a wide angled sight, as seen in FIG. 3a, is reproduced on the monitor 24 as the visitor enters in the image input area of the image input means 11. The dweller sets the sampling area SA on the screen of the monitor 24 by shifting, as shown in FIG. 3b, the cursor K denoted by a dotted line, to an area covering the bust of the visitor in the monitored image and enclosing the bust of the visitor as denoted by a solid line in FIG. 3b. In this state, the sampling area SA is magnified to reproduce the bust over the entire screen of the monitor 24. In the foregoing arrangement, the image memory 22 has been referred to as being single where the frame to be input in the image memory 22 and the frame to be displayed as magnified alternate, causing a slight flicker to occur in the reproduced image. The image quality is improved by digitizing the image signal, allowing the dweller to reliably visibly confirm the visitor. Flicker may be prevented by providing two sheets of the image memory 22 for alternate use as changed over to repeat the input image display and magnified image display, forming a complete image reproduction.

Figure 3D:
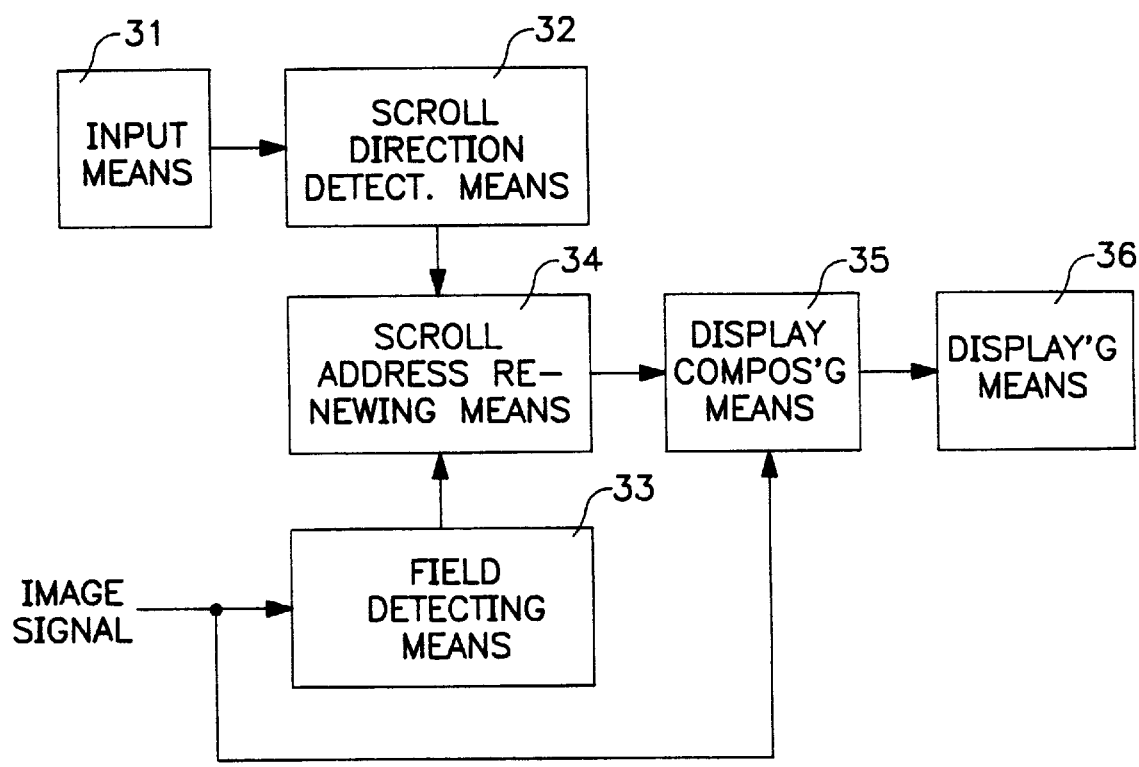

FIG. 3d shows an arrangement including means for changing the position of the cursor by scrolling the cursor about the image being displayed on the monitor. In operation, input means 31 allows the operator to control the scrolling direction. Input means 31 may include a joy stick, scroll buttons, track ball, or other device for producing a signal indicative of a scrolling direction. Scroll direction detecting means 32 detects the signal indicating the scrolling direction and generates a scroll direction signal. The scroll direction signal is received by scroll address renewing means 34. A field signal may be extracted from an image signal by field detecting means 33. The scroll address renewing means 34 is coupled to the field detecting means 33 and receives the field signal. The scroll address renewing means 34 calculates an address of the cursor to be displayed using the scroll direction signal and the field signal. A display composing means 35 is coupled to the scroll address renewing means 34 and display means 36. The display means may, for example, include a monitor. The display composing means 35 may also receive the image signal. The display composing means 35 receives the address calculated in the address renewing means and inserts a signal corresponding to a desired cursor image in the image signal at the calculated address for display on the display means 36.

For interlaced monitors, the displayed position of the cursor is renewed with a variable timing. The timing is varied by the scroll address renewing means 34 in accordance with whether the cursor scroll direction is shifted upward or downward on the display means 36. For an upward scroll, the cursor position address is renewed whenever an odd field changes over to an even field. For a downward scroll, the cursor position address is renewed whenever an even field changes over to an odd field. In this manner, the currently scanned odd field of the cursor position can be scrolled just to a next odd field adjacent to a previously scanned even field which is immediately next to the currently scanned odd field. Thus, the cursor positional change is minimized and smooth scrolling of the cursor is realized.

The scroll detection means 32, scroll address renewing means 34, field detecting means 33, and display composing means 35 may, for example, be implemented in a standard digital computer, discrete logic, a dedicated signal processor, or in the master device shown embodiments of the invention.

Figure 4:
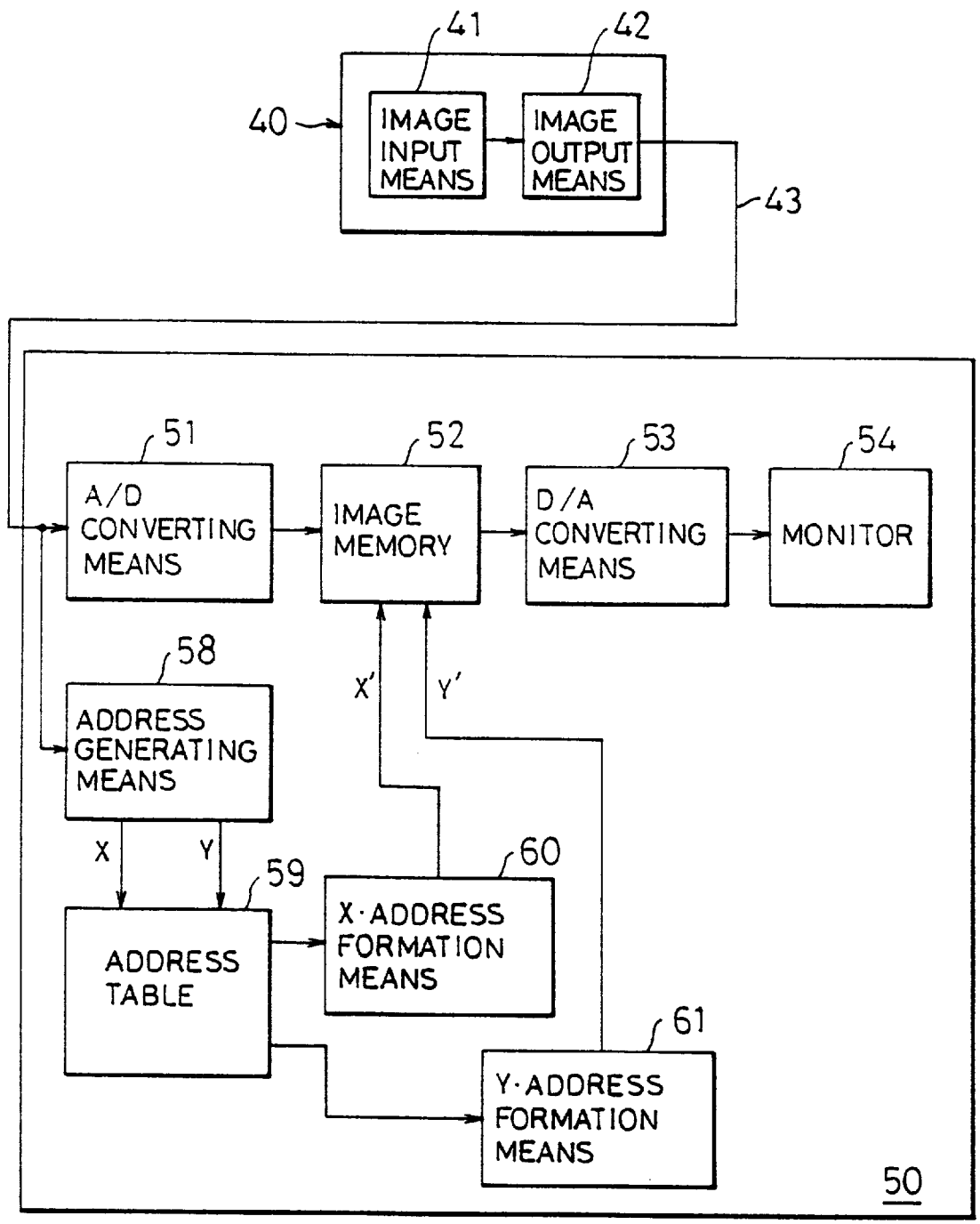
FIG. 4 shows in a block diagram another embodiment of the interphone according to the present invention.

Utilization of the wide-angled sight or wide-angle lens system may distort the reproduced picture. An arrangement effective to remove this picture distortion is provided according to one of remarkable features of the present invention. Referring to FIG. 4 showing another embodiment, the image signal from the image output means of the terminal device 40 is provided to the A/D converting means 51 in the master device 50 and at the same time to an address generating means 58 provided to the master device 50. The address generating means 58 separates a synchronizing signal from the image signal, and generates, in synchronization with the synchronizing signal, an X address in an X axis direction and a Y address in a Y axis direction for the image memory. These X and Y addresses are input into an address table 59 which may be formed with ROM or the like. The address table 59 contains correction address data $\Delta X$ and $\Delta Y$ preliminarily set for correcting the picture distortion due to the use of the wide-angle lens system. These correction address data $\Delta X$ and $\Delta Y$ are added respectively to the X and Y addresses at X-address formation means 60 and Y-address formation means 61 so as to be formed into address data X' and Y' as the desired correction data, which data are provided to the image memory 52. The image data provided from the A/D converting means 51 are thereby caused to be stored in the image memory 52 in accordance with these address data X' and Y'.

Figure 5A:
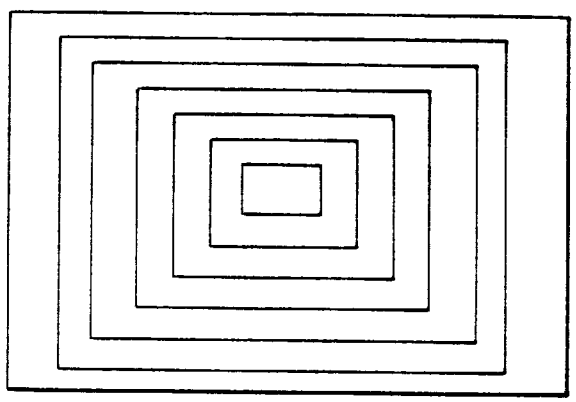
FIGS. 5 and 6 are explanatory views for the operation of the interphone shown in FIG. 4.
Figure 5B:
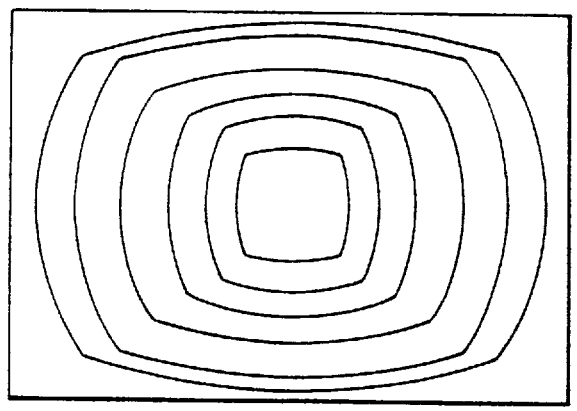
Figure 6:
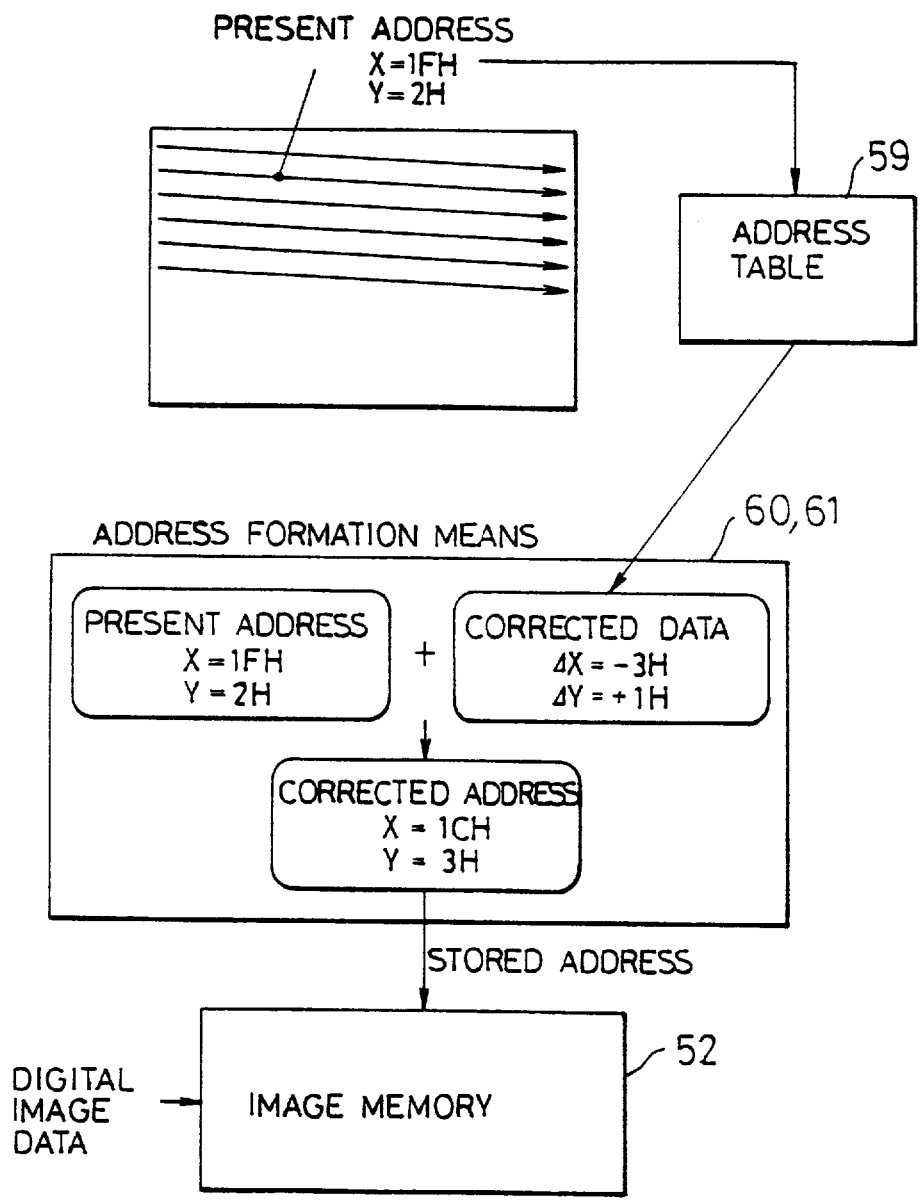

Referring to the operation of the embodiment of FIG. 4, further, the image signal provided from the image output means 42 of the terminal device 40 is made, by the use of the wide angled sight, to be a distorted image signal as shown in FIG. 5b with a slight exaggeration in contrast to a normal image signal shown in FIG. 5a. In the present instance, such image distortion is preliminarily made known through measurement, and address correspondence between the distorted image and the image to be corrected is obtained, that is, it is determined to which points the addresses of the respective picture elements of the distorted image should correspond in 1:1 relationship for the correction. In determining the corresponding relationship, here, it is possible to reach a result through a calculation so long as the space transfer function of the wide-angle lens system employed at the terminal device 40 is known but, if not, the relationship may be obtained by taking an image of such pattern as shown in FIG. 5a or any other lattice pattern, appointing how such characterizing points as corner points or lattice points in the pattern should be corrected, and obtaining other points by means of an interpolation on the basis of these characterizing points. The thus obtained correction data are preliminarily written in the address table 59.

Now, in the event where the present address generated by the address formation means 58 is existing at a picture element of X=1FH and Y=2H (H denoting a sexadecimal digit) and the correction data $\Delta X=-3H$ and $\Delta Y=+1H$ are obtained with the present address input into the address table 59, then the values of such correction data are respectively added to the present address values X=1FH and Y=2H, the corrected address of X=1CH and Y=3H is generated, and the image data of the present address X=1FH and Y=3H are housed in a picture element corresponding to the corrected address X=1CH and Y=3H in the image memory 52. With this scanning carried out over the while of the image and the data reading carried out through an ordinary raster scanning, therefore, the image read out can be made not to involve any distortion.

The above described operation requires only the reference to the address table formed by ROM and the addition of the present address to the output of the table, and the operation can be easily executed at real time. Further, the length of the correction data is relying on the distance required for the correction, that is, the distance between the mutually corresponding points, and, as the correction is executed at a position adjacent the picture elements of the distorted image, the data length may be shorter than in the case where the X and Y address is made to be stored as it is in the address table 59. For example, when the image size is made to be of 512×512 picture elements and the X and Y addresses are stored as they stand, it is necessary that the data are of 9+9=18 bits. When, however, the correction range is made to be of +7 to −8 picture elements for the X and Y addresses, the data may be of 4+4=8 bits, and the table capacity can be made smaller to 8/18 than in the case of the former. In this manner, the image data for one picture components are written into the image memory 52 while shifting the image data to the corresponding points of the image distortion, the written data are then read out by means of the ordinary raster scanning, the read out data are D/A converted to be displayed on the monitor 54, and the visual confirmation of the visitor can be made with the monitored image involving no distortion.

In the embodiment of FIG. 4, other arrangements and their functions are the same as those in the embodiment of FIG. 1, and the same constituent elements as those in the embodiment of FIG. 1 are denoted in FIG. 4 with the same reference numerals but with 30 added as those used in FIG. 1.

Figure 7:
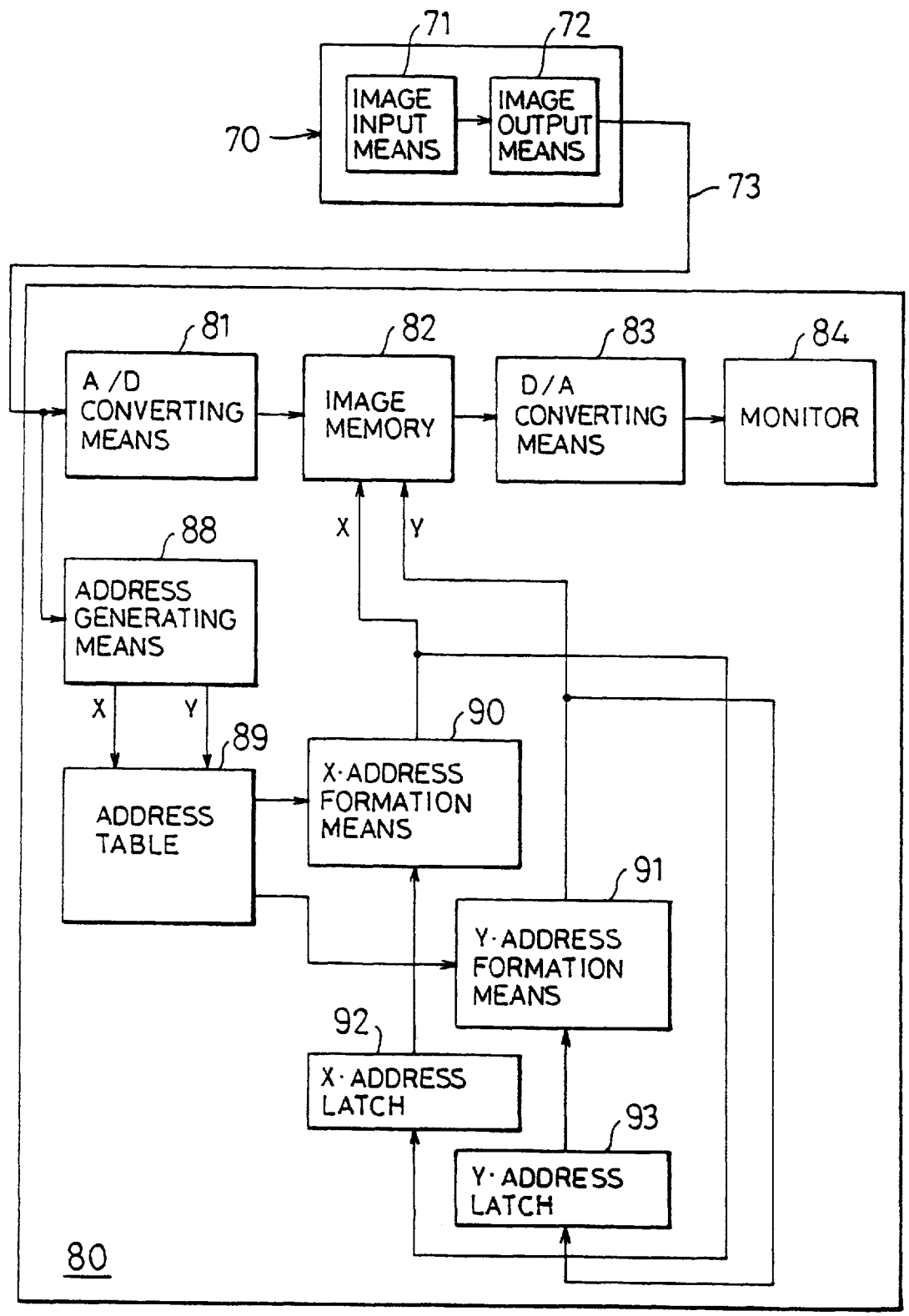
FIG. 7 is a block diagram showing still another embodiment of the interphone according to the present invention.
Figure 8:
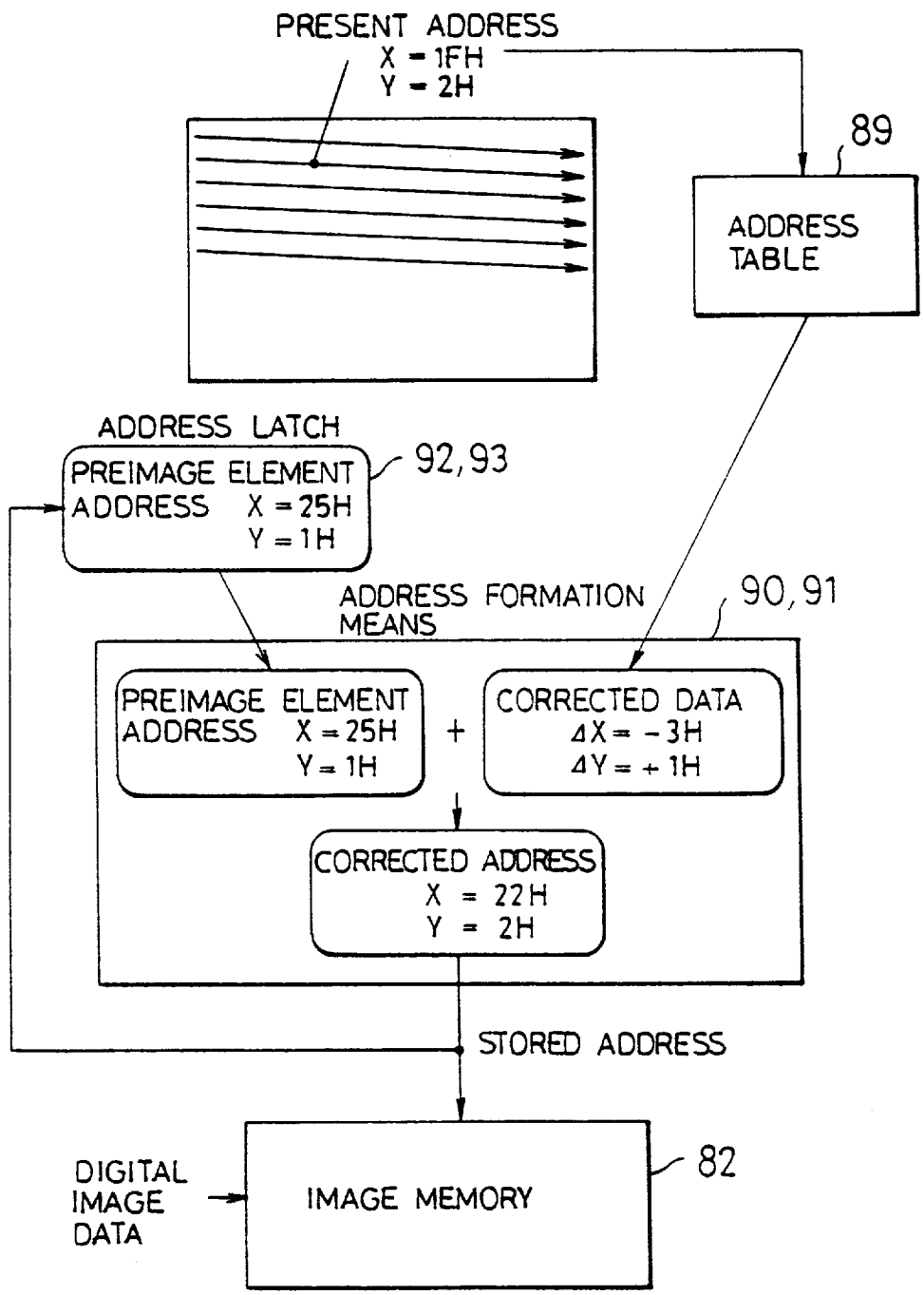
FIG. 8 is an explanatory view for the operation of the interphone of FIG. 7.

In FIG. 7, there is shown still another embodiment in which the interphone is improved in respect of the monitored image distortion. In the present embodiment, an X-address latch 92 and Y-address latch 93 are additionally provided to the master device 80 in contrast to the embodiment of FIG. 4. In these X-address and Y-address latches 92 and 93, the corrected addresses of previous picture element are held to be employed for calculating the correction of the next picture element. That is, while in the foregoing embodiment the correction data are added to the present picture element address in generating the corrected addresses at the X-address and Y-address formation means 90 and 91, the arrangement in the present embodiment is so made that, as shown in FIG. 8, the correction data are added to the corrected data of the previous picture element. The previous picture-element address employed for the address-correction calculation for an initial picture element of the image is preliminarily calculated and set in the X-address latch 92 and Y-address latch 93. Now, according to the present embodiment, the addition of the correction data to the corrected data on the previous picture element allows the correction data length to be made shorter than in the case of, for example, the embodiment of FIG. 4, and the data length at the address table 89 can be also shortened by the shortened amount of the correction data length.

In the present embodiment of FIG. 7, all other arrangements and their functions are the same as those in the foregoing embodiment of FIG. 4 or the preceeding one of FIG. 1, and the same constituent elements as in the embodiment of FIG. 4 are denoted by the same reference numerals but with 30 added as those used in FIG. 4.

In FIG. 9, there is shown another embodiment for eliminating the monitored image distortion with a simpler arrangement, in which the image signal from the terminal device 100 is provided to the A/D converting means 111 and also to a synchronous separating means 124 in the master device 110. At the synchronous separating means 124, synchronous signal in the horizontal and vertical directions is extracted out of the image signal, and a picture-element sampling clock synchronizing with the horizontal synchronous signal is sequentially generated. At the address generating means 118 to which the picture-element sampling clocks are sequentially provided, the clocks are counted to generate a horizontal address (X address) and the horizontal synchronous signals are counted to generate a vertical address (Y address). In the address converting table 119 to which the X and Y addresses are provided, there are written address converting data on the respective picture elements along the distortion characteristics due to the wide angle lens system and, in order to simplify the arrangement for correcting the distortion, the arrangement is so made as to convert only the X address, that is, the horizontal address. Therefore, while the X' and Y' addresses are obtained in the case where the picture element having the X and Y addresses is subjected to the convertion at the address converting table 119, the Y' address is made to be of the same value as the Y address.

In the A/D converting means 111, on the other hand, digital image data are formed by the image sampling clocks provided from the synchronous separating means 124 and are provided to line memories 125 and 126. While the data are stored in these line memories 125 and 126 for every horizontal line, they are stored at this time at positions appointed by the horizontal addresses X' provided from the address converting table 119. In this case, the data writing into the memories 125 and 126 is made to be of a randam access because of the address conversion being made. The arrangement is also so made that, simultaneously with the writing of the one line, the data will be provided to the D/A converting means 113 from the other line memory in which the data on a previous line are stored. That is, these two line memories 125 and 126 are alternately operated so that, when one of them is in the writing state, the other will be in the reading state, and the writing and reading of the sequential horizontal line data of the image signal can be realized in a smooth manner. In the present embodiment, therefore, the two line memories 125 and 126 are caused to operate as a sort of alternate buffers, and a real time address correction is made possible, without impairing the throughput of the sequential horizontal line data of the image.

Further, the image data made to be the analogue signals at the D/A converting means 113 are provided to the monitor 114 for being reproduced thereon as the image corrected in respect of the distortion. While in the foregoing arrangement the address correction is carried out upon writing of the data into the line memories 125 and 126 and their reading is executed with ordinary sequential addresses, it may be also possible to carry out, inversely to the above, the data writing into the line memories 125 and 126 with the ordinary sequential addresses and their reading with the corrected addresses.

Figure 10A:
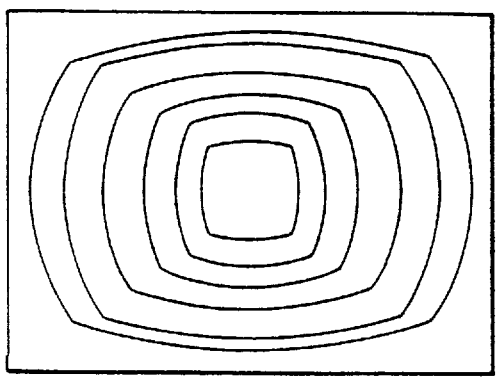
FIGS. 10 and 11 are explanatory views for the operation of the interphone shown in FIG. 9.
Figure 10B:
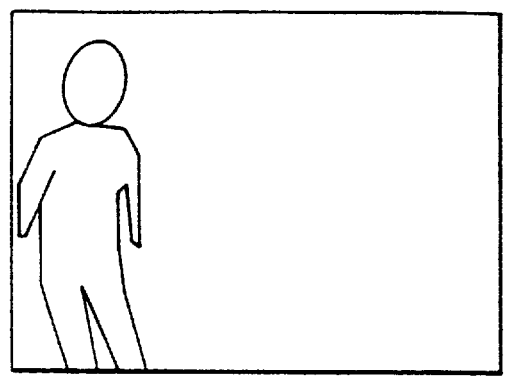
Figure 10C:
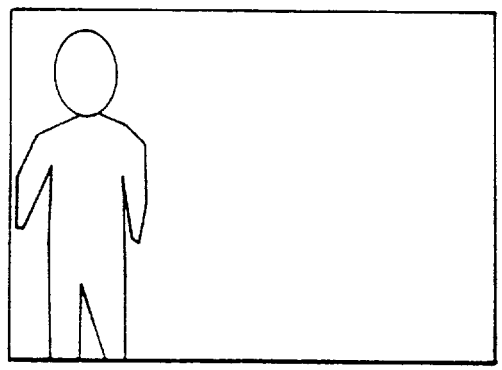

Referring next to the correction of the distortion in the present embodiment with reference to FIG. 9 in conjunction with FIG. 10, such barrel form distortion due to the wide angle lens as shown in FIG. 10a shows a characteristic of increasing the distortion as further separating from the center of the screen and image portions closer to respective corners of the screen are caused to approach the center of the screen as seen in FIG. 10b in contrast to their positions in the image involving no distortion. In correcting such distortion, therefore, the picture elements of the corner portions are to be shifted in directions of discharging out of the screen so that the correction can be executed in equivalent manner. The correction with such shifting of the picture elements should allow a highly precise correction to be realized when executed in both of the horizontal and vertical directions, but, in the interphone with television, it suffices the purpose if the confirmation of individuality can be sufficiently performed, and the shifting of the picture elements only in the horizontal direction is performed so as to attempt the simplification of the correcting arrangement. Here, the image to be taken is mainly of the visitor standing in front of the terminal device 100 or an area convering the visitor's face which is substantially symmetrical with respect to a vertical line. Therefore, when an image in a state shown in FIG. 10b is subjected to a correction of the distortion in the horizontal directions, it has been found that the corrected image will be such one of as shown in FIG. 10c, which involves no remarkable influence on the visual confirmation of the visitor even when any slight distortion in the vertical directions remains.

Figure 11A:
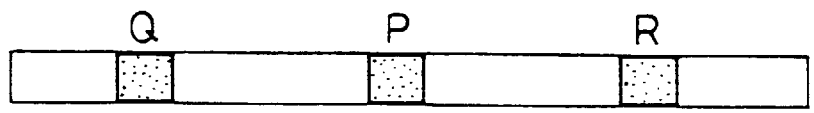
Figure 11B:
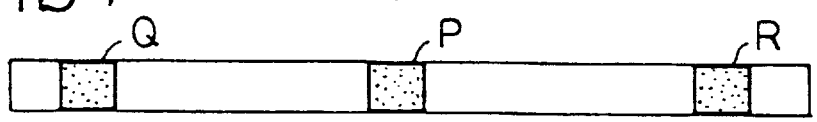

The foregoing barrel form distortion becomes more remarkable as peripheral side edges of the image or of the screen approach, and thus the distortion at both end portions of every horizontal line will be larger and remarkable. Accordingly, the address conversion for the correction of such distortion should correspond to the magnitude of the distortion, so that the extent of shifting of the picture element will have to be made larger as the element is at closer position to the both ends of every horizontal line. That is, when the respective picture elements P, Q and R generated at the address generating means 118 for the image data of one horizontal line component are as shown in FIG. 11a, the addresses of these picture elements P, Q and R converted at the address converting table 119 will be as shown in FIG. 11b, in which the picture element P at the center of the horizontal line is caused to involve substantially no shift while the picture element Q closer to the left side end of the line and the picture element R closer to the right side end of the line are shifted to be more closer to the left and right side ends, and the correction of distortion is to be executed in conformity to such extent of the shift.

In the embodiment of FIG. 9, other arrangements and functions of the interphone are the same as those in the embodiment of FIG. 4 or the foregoing one of FIG. 1, and the same constituents as those in the embodiment of FIG. 4 are denoted in FIG. 9 with the same reference numerals as in FIG. 4 but with 60 added.

Figure 12:
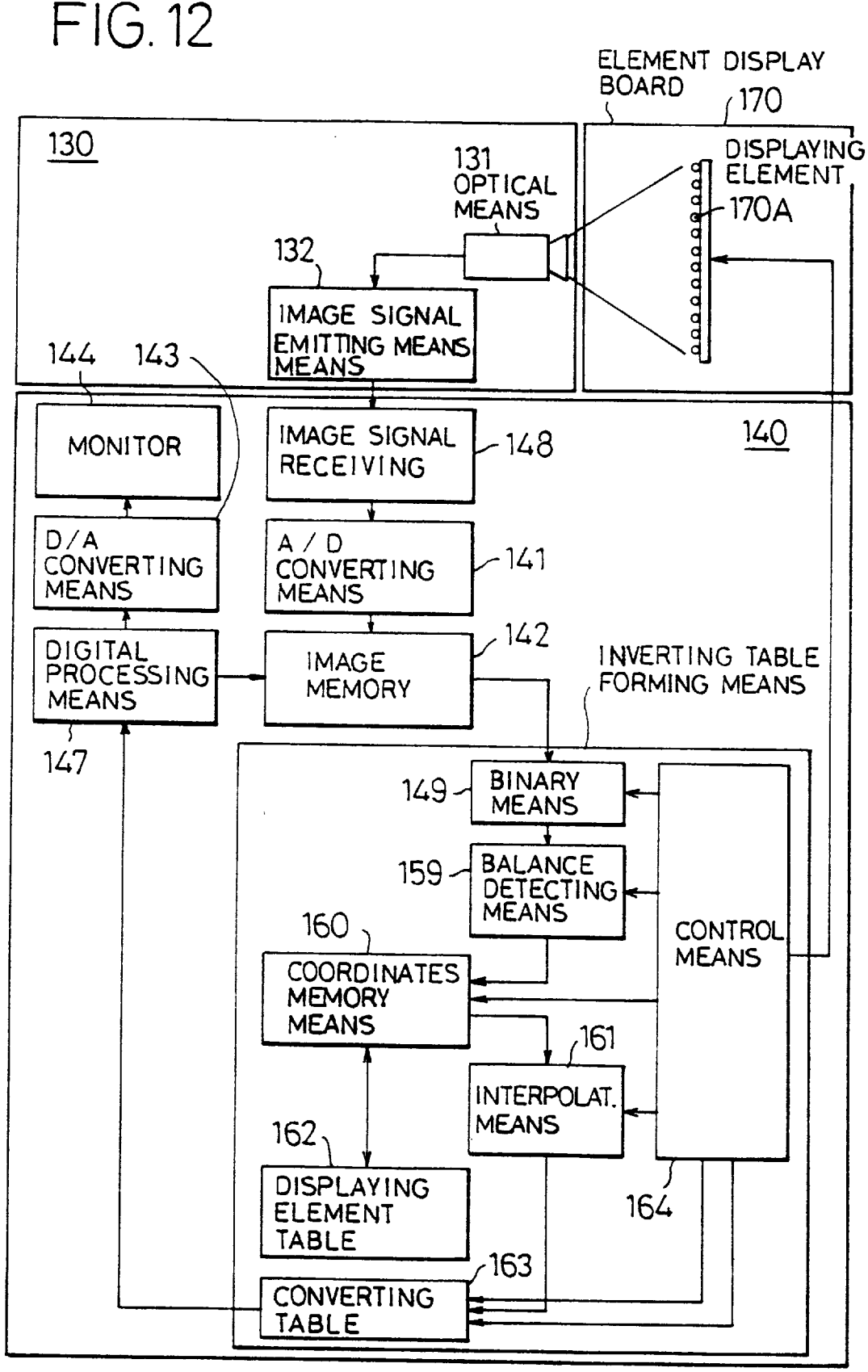
FIG. 12 shows in a block diagram still another embodiment of the interphone according to the present invention.

In another embodiment of the interphone with television according to the present invention, as shown in FIG. 12, there is provided an improved table. More specifically, the image signals provided from the image signal emitting means 132 in the terminal device 130 are subjected to the same signal processing as in the foregoing embodiments through the image signal receiving means 148, A/D converting means 141 and image memory 142 in the master device 140 and, thereafter, the thus processed image data are provided to a converting table forming means which comprises a binary means 149 which receives the image data directly from the image memory 142 and modifies them into binary signals, a balance or centroid detecting means 159 receiving the binary signals and detecting centroid position of the signals, a coordinate memory means 160 storing coordinate signals of the centroid position provided from the balance detecting means 159 as well as corresponding relationship between the centroid position coordinates and coordinates of a displaying element read out of a displaying element table 162 for the correction, an interpolation means 161 for executing an interpolation of positions between corresponding coordinates on the basis of the relationship stored in the coordinate memory means 160, a corrective converting table 163 for storing conversion data denoting corresponding relationship between coordinates of distortion-involving image data obtained by practically taking an image of the displaying elements by means of the interpolation and further coordinates preliminary set without involving any distortion, and a control means 164 for controlling the respective means in the converting table forming means as well as lighting on and off of displaying elements 17A on a later described element display board 170.

The conversion data provided from the corrective converting table 163 are input into a digital processing means 147 in which the real time image data read out of the image memory 142 are processed by the conversion data to provide a set of coordinate-converted data, that is, corrected image data. At the D/A converting means 143, the thus corrected image data from the digital processing means 147 are analogue-coded at the D/A converting means 143 to be provided to the monitor 144 for displaying the image on the screen of the monitor 144.

The displaying elements 170A on the display board 170 consist of LED or the like, many of which are arranged in arrays on a single plane at fixed intervals, and this display board 170 is mounted so that an optical image taking means 131 can take its display image.

Referring to the operation of this embodiment, next, the displaying element table 162 for the correction is first prepared preliminarily so as to act the foregoing function, upon which the table 162 is made to render the displaying elements 170A on the board 170 to provide the corrected image also at equal intervals so long as the elements 170A are disposed on the board at equal intervals and to expand over the screen of the monitor 144 at proper intervals. Further, the displaying element table 162 is made to be provided with, for example, representing numbers of the displaying elements 170A and X and Y coordinates. For such displaying element table 162 for the correction, it will be possible to employ a secondary memory.

Next, the element display board 170 is mounted to the optical image-taking means 131, upon which the board 170 is provided for varying its distance from the optical means 131 while allowing the image of all of the displaying elements 170A to be taken by the optical means 131 all the time. In order to obtain the coordinates of the displaying elements 170A for the image before the correction, the elements of first stage on the board 170 are lighted on by the control signals from the control means 164, and the image data from the image-taking optical means 131 are made to be stored in the image memory 142. Here, the displaying elements 170A the image of which are to be taken are not always limited to the ones only for a single picture element but may happen to be of a zone including a plurality of the picture elements, so that the image data to be stored at the image memory 142 are binary coded at the binary means 149, the coordinates of the centroid of the image zone obtained by the balance detecting means 159 are computed and the thus obtained coordinates are stored in the coordinate memory means 160 in the sequence of the numbers of the displaying elements and their X and Y coordinates in the same manner as in the displaying element table 162 for the correction.

Figure 13A:
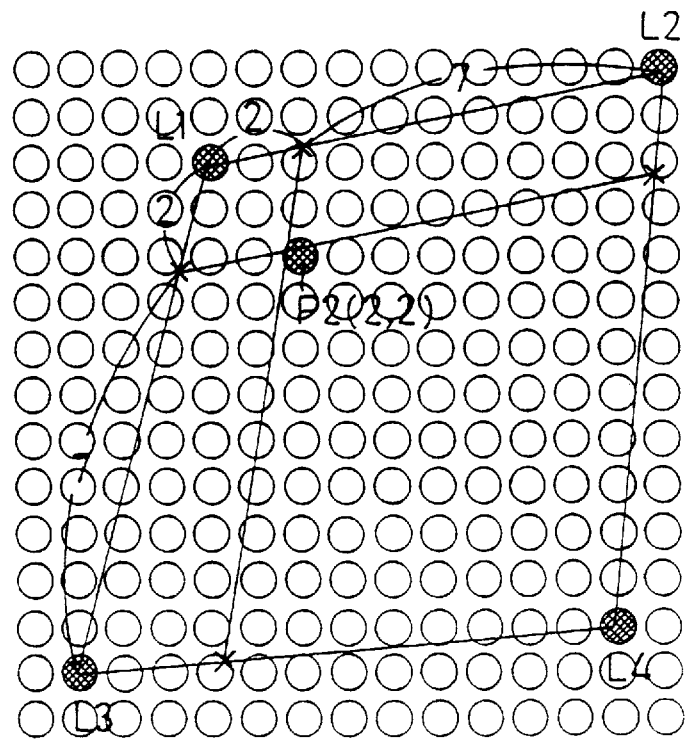
FIG. 13 is an explanatory view for the operation of the interphone shown in FIG. 12.
Figure 13B:
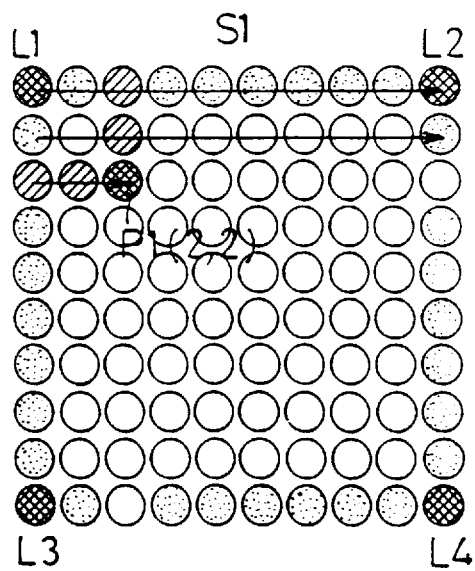

The above operation is to be performed with respect to respective ones of the displaying elements 170A, the correspondence between the coordinates of the respective displaying elements 170A stored in the coordinate memory means 160 with the coordinates of these elements preliminarily stored in the displaying element table 162 for the correction is taken, and the coordinate conversion data of the displaying elements 170A before and after the correction are thereby obtained. Here, the correspondence of the picture elements between the mutually adjacent displaying elements 170A is taken by the interpolation means 161. That is, as will be clear when FIGS. 13a and 13b are referred to, the correspondence is taken with the minimum after-correction square S1 formed by the displaying elements 170A denoted by L1–L4 made as a reference. These displaying elements 170A forming the minimum square S1 may be preliminarily held as a table, for example, or may be easily computed by detecting the number of the displaying elements of one line. In the case where the interval between the respective displaying elements 170A is not large enough, a linear interpolation may be made by means of a quadrilateral formed by the displaying elements before being corrected and corresponding to the minimum square.

For the linear interpolation, in the case where, for example, the minimum square S1 is formed with 10 picture elements on each side, a point P2 (2,2) in a before-correction square S2 (FIG. 13a) and corresponding to a point P1(2,2) in the minimum after-correction square S1 (FIG. 13b) can be determined by obtaining an intersection point of a first straight line connecting between a point internally dividing a side L1,L2 of the before-correction square S2 into 2:7 and a point internally dividing an opposing side L3,L4 also into 2:7, with a second straight line connecting between a point internally dividing another side L1,L3 into 2:7 and a point internally dividing its opposing side L2,L4 also into 2:7. In general, the intersection point at this time takes a real number value and is to be converted into an integer value by counting any fraction over 0.5 as one and disregarding the rest. This operation is executed with respect to all of the points in the minimum square S1, and all corresponding points are obtained with respect to all possible squares. In this way, the corresponding relationship between the coordinates before and after the correction is to be obtained, and this corresponding relationship is stored in the converting table 163 for the correction to complete the preparatory step.

Next, a real image is taken by the image input means of the terminal device 130, the image data provided to the image memory 142 are subjected to the coordinate conversion at the digital processing means 147 while referring to the data on the converting table 163 for the correction, the correction of the distortion is thereby realized and, similarly to the foregoing embodiment, such distorted image as in FIG. 5b is reproduced on the monitor 144 as such corrected image as in FIG. 5a.

In the embodiment of FIG. 12, all other arrangements and their functions are the same as those in the foregoing embodiment of FIG. 4 or of FIG. 1, and all constituents in FIG. 12 which are the same as those in the embodiment of FIG. 4 are denoted by the same reference numerals as those used in FIG. 4 but with 90 added thereto.

Figure 13C:
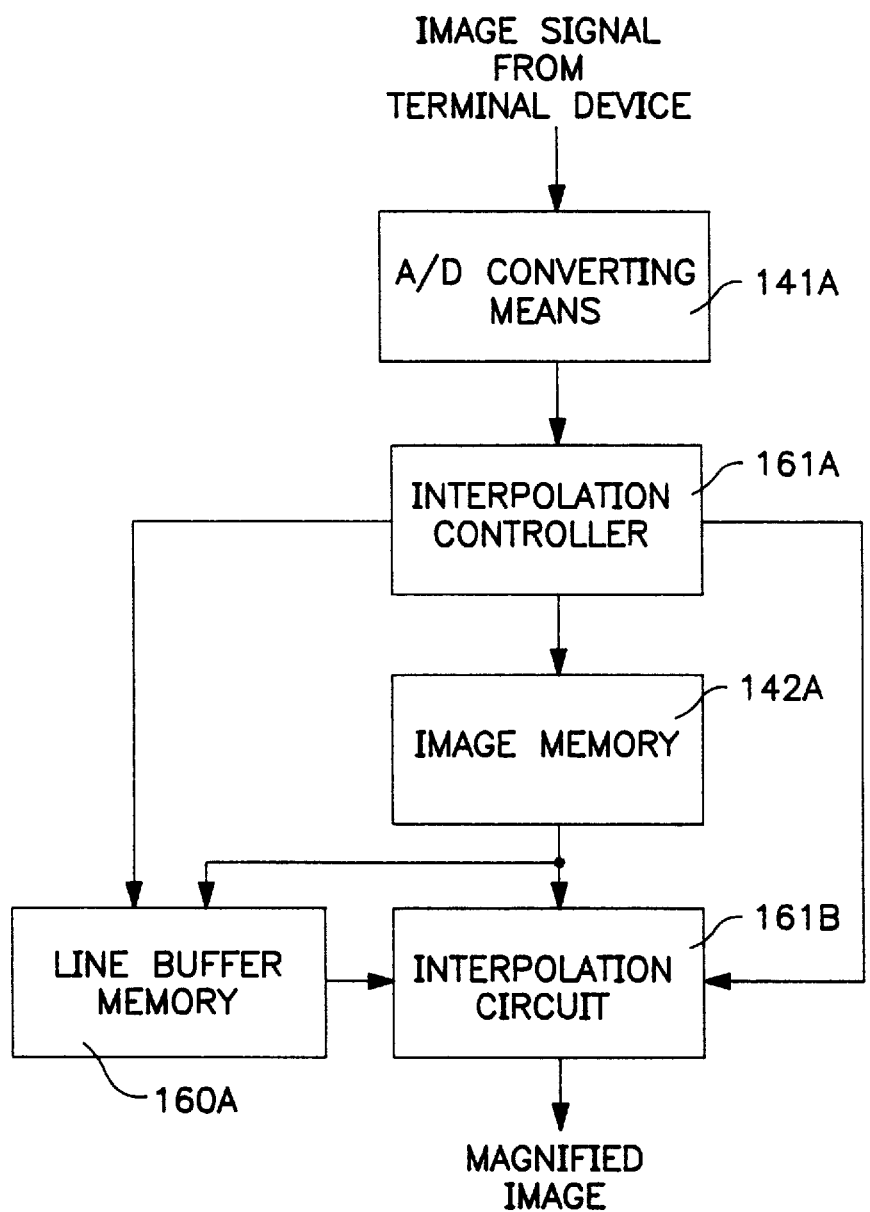

The interpolation technique can be utilized not only in the above described arrangement for correcting the distortion of the wide angle image, but also in an arrangement for zooming or magnifying part of the wide angle image. For example, FIG. 13c shows a block diagram of a zooming circuit according to the present invention. Picture element data from the image signal received from the terminal device are converted into a digital signal using A/D converting means 141A. The digital signal is received by an interpolation controller 161A. The interpolation controller 161A is coupled to the A/D converting means 141A and the image memory 142A. The interpolation controller 161A outputs a memory operation controlling signal which is received by the image memory 142A for storing the magnified part of the picture element data in the memory 142A. The memory operation controlling signal causes the magnified part of the stored picture element data to be transmitted from the memory 142A to the line buffer memory 160A and to an interpolation circuit 161B. The line buffer memory 160A is controlled by the interpolation controller 161A and stores the picture element data for a scanning line delayed by one scanning line from that of the picture element data stored in the image memory 142A. The interpolation circuit 161B is also controlled by the interpolation controller 161A for interpolating in both vertical and horizontal directions on the basis of the picture element data from the image memory 142A and the picture element data of the one scanning line from the line buffer memory 160A. Thus, the picture element data of a magnified image about two times as large as the magnified part of the original image signal may be provided.

Figure 13D:
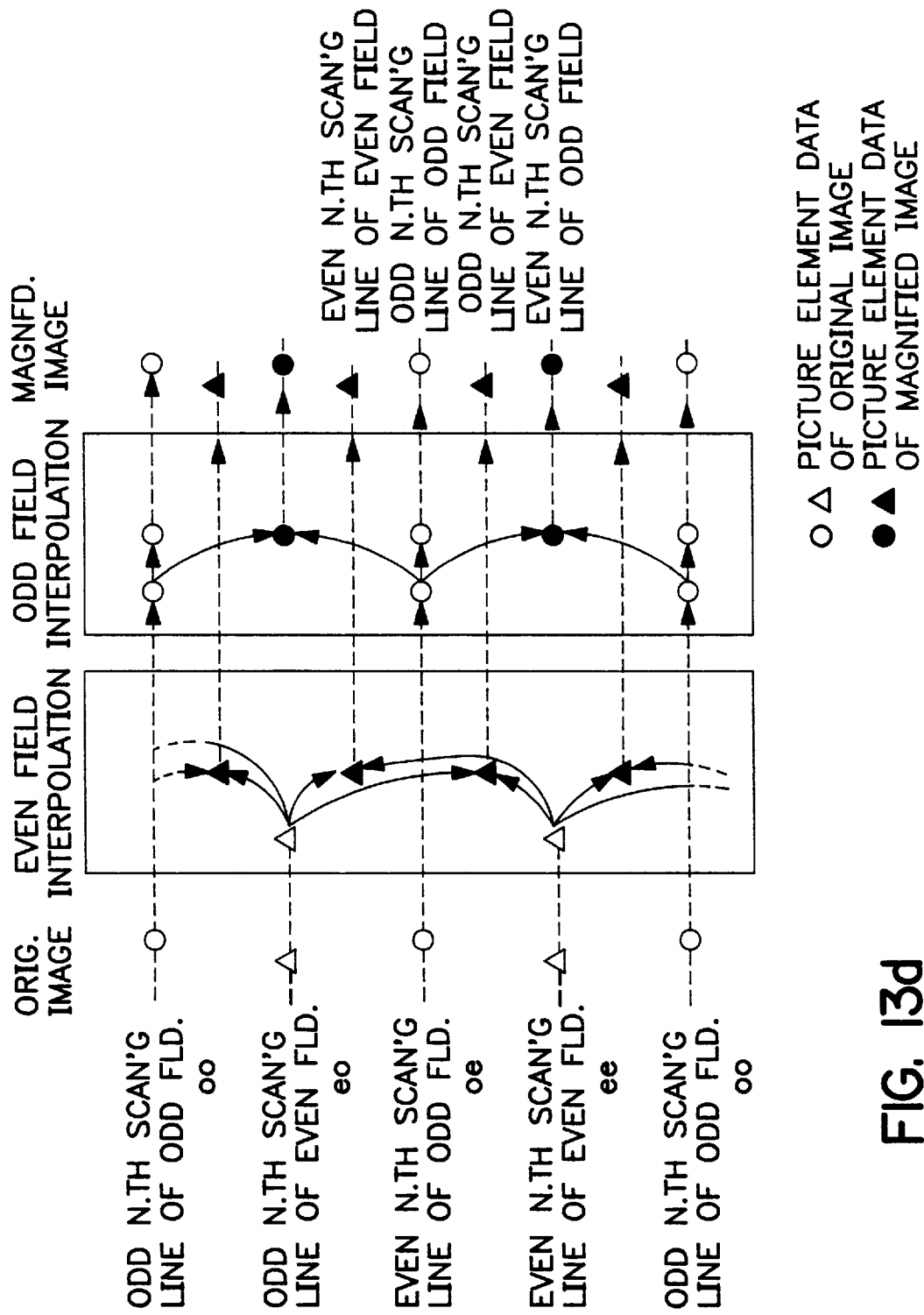

The interpolation circuit 161B interpolates the picture element data in the vertical direction of the even fields of the magnified image part with the picture element data of the even fields of the original image and the picture element data in the vertical direction of the odd fields of the magnified image part with the picture element data of the odd fields of the original image. Similarly, the picture element data in the horizontal direction of the magnified image part is interpolated with adjacent picture element data on the same scanning line in each field of the magnified image part, respectively, as shown in FIG. 13d.

In still another embodiment of the interphone with television according to the present invention, a more excellent improvement in respect of the distortion of the reproduced image can be realized. Referring more specifically to this embodiment by references to FIG. 14, the input image signal from the terminal device and digitalized at the A/D converting means 171 is provided to an input image buffer 172 which comprises, for example, an FIFO memory into which the digitalized image signal is written for every horizontal line in synchronism with an A/D conversion clock. The input image signal from the terminal device is also provided to a synchronous signal separating means 173, where the synchronous signal is separated from the image signal so that the respective means in the master device may be actuated on the basis of this synchronous signal. At the address formation means 175 to which the synchronous signal from the separating means 173 is provided, there are formed two-dimensional addresses (X,Y) which are of before the correction of distortion and comprise an X address in the horizontal direction and a Y address in the vertical directions. As these addresses (X,Y) are input into an address converting means 174, the distortion only in the horizontal X directions is corrected, and the address converting means 174 provides converted two-dimensional addresses (x,Y) of converted horizontal address x and the non-converted vertical address Y.

More practically, the address converting means 174 is adapted to formularize the image distortion characteristics due to the wide angle lens or the like for computing the converted addresses and to preliminarily store integer portion of a result of the computation in a memory table. In this case, decimal portion of the computation result for the onverted addresses is stored in an interpolation coefficient table 176 for being read out as a correction coefficient at the same time when the memory table in the address converting means 174 is accessed. When a high speed operational circuit capable of operating in real number the converted addresses at real time is employed as the address converting means 174, it becomes unnecessary to preliminarily store the integer portion of the computation result in the address converting memory table, nor to preliminarily store the decimal portion of the result in the interpolation coefficient table 176, but the integer portion itself of the operational circuit output may be made to be the converted addresses while the decimal portion as it is may be employed as the correction coefficient.

Figures 15, 16:
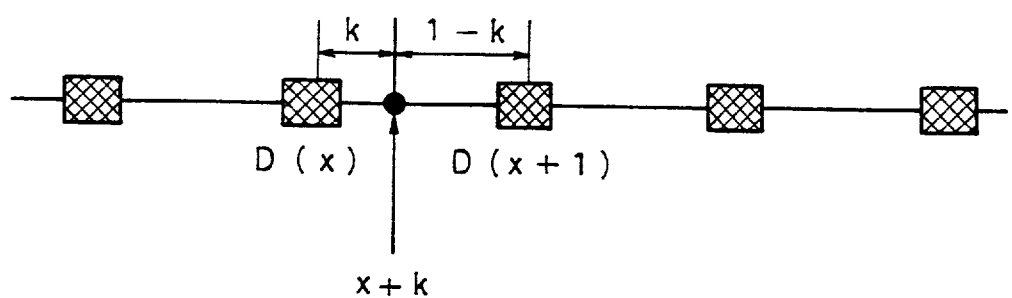
FIGS. 15 to 18 are explanatory views for the operation of the interphone of FIG. 14.

The memory table in the above address converting means 174 will be of such arrangement as shown in FIG. 15, in which the data "x" read out in correspondence with the two-dimensional addresses (X,Y) are made to be the corrected horizontal addresses of the image signal to be referred to. Since at this time only the single dimensional address conversion is carried out, the vertical addresses are of the initial Y only. Provided that the two-dimensional addresses (X,Y) from the address formation means 175 are (2,1), the data x written in the memory table as in FIG. 15 will be 43, and the converted two-dimensional addresses (x,Y) to be referred to will be (43,1). While in the present arrangement the image data are sequentially written into the input image data buffer 172, it may be also possible to employ a system of reading the written data simultaneously with the writing, reading the data after completion of the writing of the data for each horizontal line, or the like. In the case of such simultaneously reading system, the reading is carried out up to the converted reference addresses (x,Y) obtained from the address converting means 174, and the data of such reference addresses (x,Y) and of next addresses (x+1,Y) are provided to an interpolation operating means 177 where, when the memory table of FIG. 15 is employed, the data of (43,1) and (44,1) are to be provided to the interpolation operating means 177.

Figure 17:
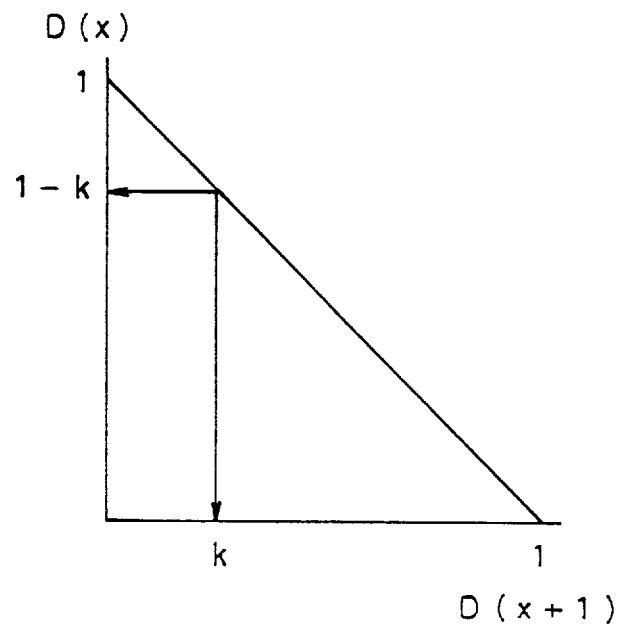

In this interpolation operating means 177, picture element values (the brightness here) of the converted coordinates are calculated on the basis of the interpolation coefficient and the respective data of the reference addresses and next addresses, and results of the calculation are stored in the image memory 178. In FIGS. 16 and 17, there are shown examples of the interpolation operation. In an event where the distortion of image can be more or less approximated by means of a certain formula, the calculation result of the address conversion for correcting the distortion or, in other words, the converted coordinates will not be of integer number but of the real number including the decimal portion, and no accurate picture element value can be obtained even when the input image is referred to on the basis of the integer portion of the real number addresses, but this respect can be compensated for by the interpolation operating means 177 in the present embodiment. Here, it is made possible to obtain more accurate picture element values by executing the linear interpolation with respect to two picture element values which are adjacent in the horizontal directions, for example. That is, when it is assumed that the calculation result of the converted two-dimensional addresses is (x+k) in which x is the integer portion and k is the decimal portion of the converted addresses, then the linear interpolation is to operate, as based on the picture element value D(x) at the address x and the picture element value D(x+1) at the address (x+1), such interpolation formula as $$(1-k) \cdot D(x) + k \cdot D(x+1)$$

and operational results are made to be the picture element values after the address conversion. With this interpolation formula, it is intended to calculate, by means of the linear interpolation, the data of a point (x+k) which divides an interval between the both addresses x and (x+1) into k:(1−k), as seen in FIG. 16, from the data D(x) at the address x and the data D(x+1) at the address (x+1 ), and the weight with respect to the data D(x) taken on the ordinate and the weight with respect to the data D(x+1 ) taken on the abscissa are to vary in accordance with the interpolation coefficient k which can be presented by a straight line, as shown in FIG. 16.

The interpolation-calculated values operated as in the above are written in the addresses currently being processed at the image memory 178. The foregoing processings are sequentially carried out in a series so that the data for one picture component (1 frame or field) will be accumulated in the image memory 178, these data read out at a next frame or field and the image signal will be provided through the D/A converting means 179 and synchronous signal mixing means 173A.

It has been found that, according to the present embodiment, as will be clear from the above descriptions, the correction of distortion can be effectively carried out in the present embodiment only by the conversion of the single dimensional addresses, and the visual confirmation of the visitor on the monitor can be executed in a smooth manner.

Further, the arrangement of the conversion required only for the addresses in the horizontal directions allows the storage of the input image data to be limited only to those for a single line, and it is possible to simplify the required hardware.

Figure 18:
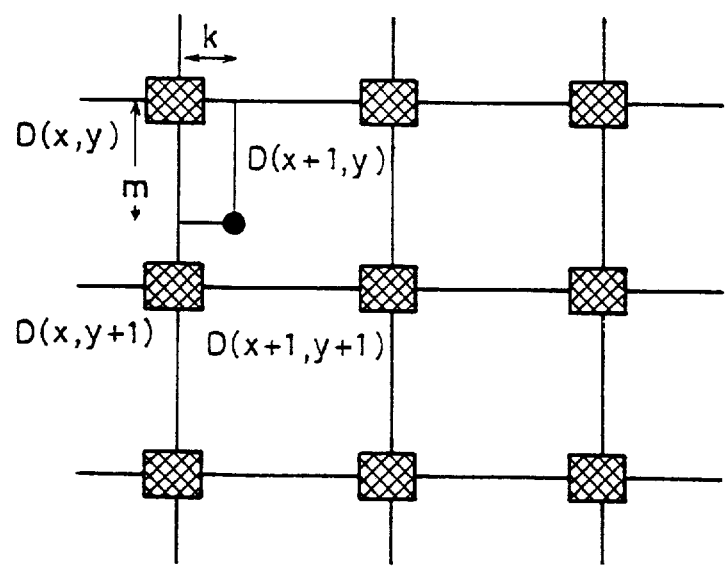

It is of course possible to further improve the correction of distortion by converting the addresses in the vertical directions, in addition to the foregoing conversion of the addresses in the horizontal directions. That is, while in the foregoing single dimensional address conversion the interporation operation has been executed between two adjacent picture elements, the two-dimensional address conversion requires the interpolation operation to be executed between mutually adjacent four picture elements as shown in FIG. 18. In this case, the picture element values (brightness) after the interpolation in the case where the addresses after the conversion as obtained through the two-dimensional address conversion are (x+k,y+m) are given as $$(1-k) \cdot (1-m) \cdot D(x,y)$$

$$+(1-k) \cdot m \cdot D(x,y+1)$$

$$+K \cdot (1-m) \cdot D(x+1,y) \text{ and}$$

$$+k \cdot m \cdot D(x+1,y+1).$$

Here, x is the integer portion of the horizontal address, k is the decimal portion of the horizontal address, y is the integer portion of the vertical address, m is the decimal portion of the vertical address, and D(x,y) is the picture element value of the address (x,y). With such two-dimensional address conversion and interpolation operation executed as in the above, the image distortion can be corrected more precisely than in the case of executing the single dimensional address conversion and interpolation operation. While the image signal provided by an image input means employing an ultra-wide angle lens (e.g., about 120 degrees in horizontal angle of view) is caused to involve a considerable extent of barrel shape distortion as has been described with reference to FIG. 5b, the two dimensional address conversion and interpolation operation can realize the precise correction.

Figure 14:
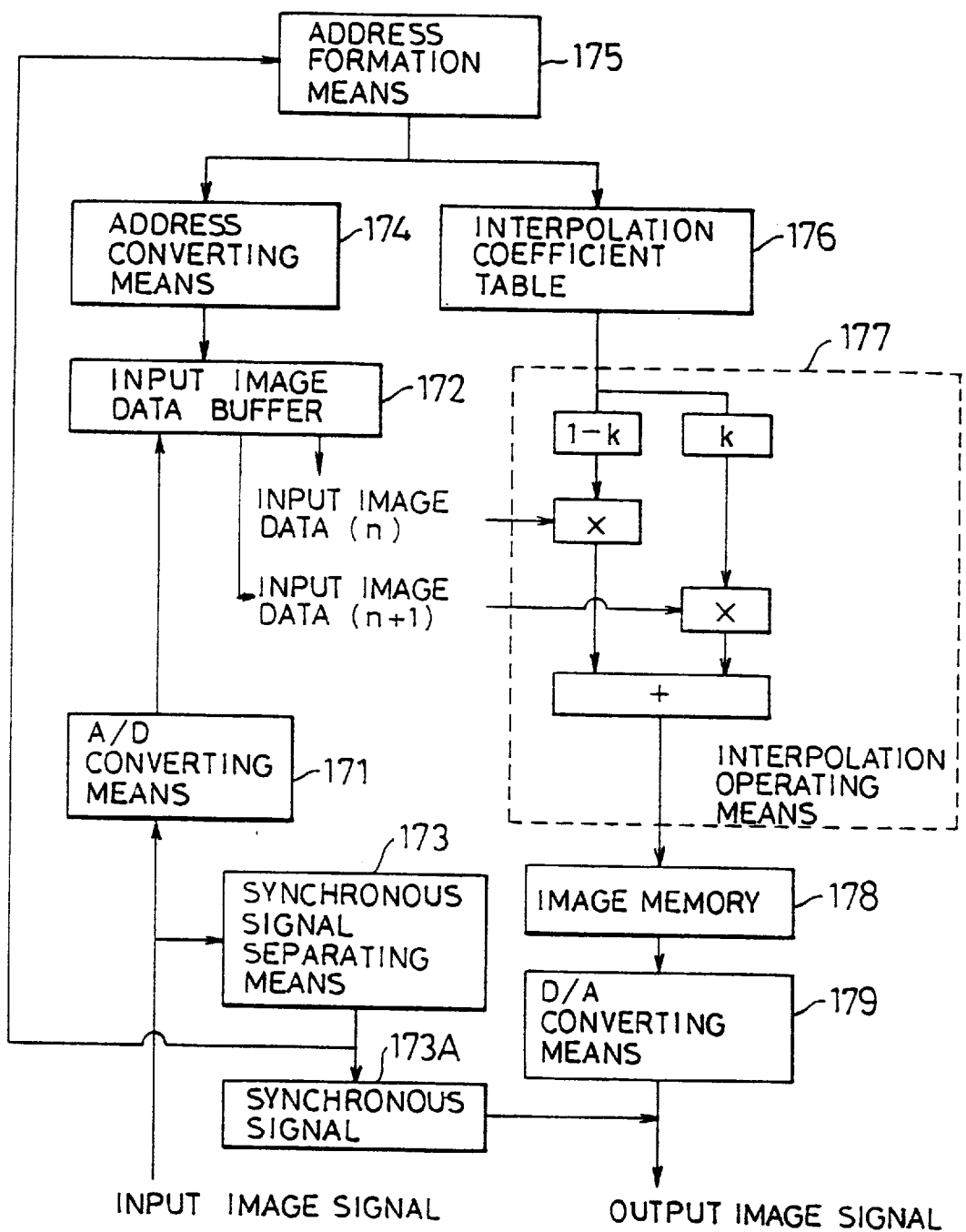
FIG. 14 is a block diagram showing another embodiment of the interphone according to the present invention.

In the embodiment of FIG. 14, all other arrangement and their functions are the same as those in the respective embodiments which have been described.

Figure 19:
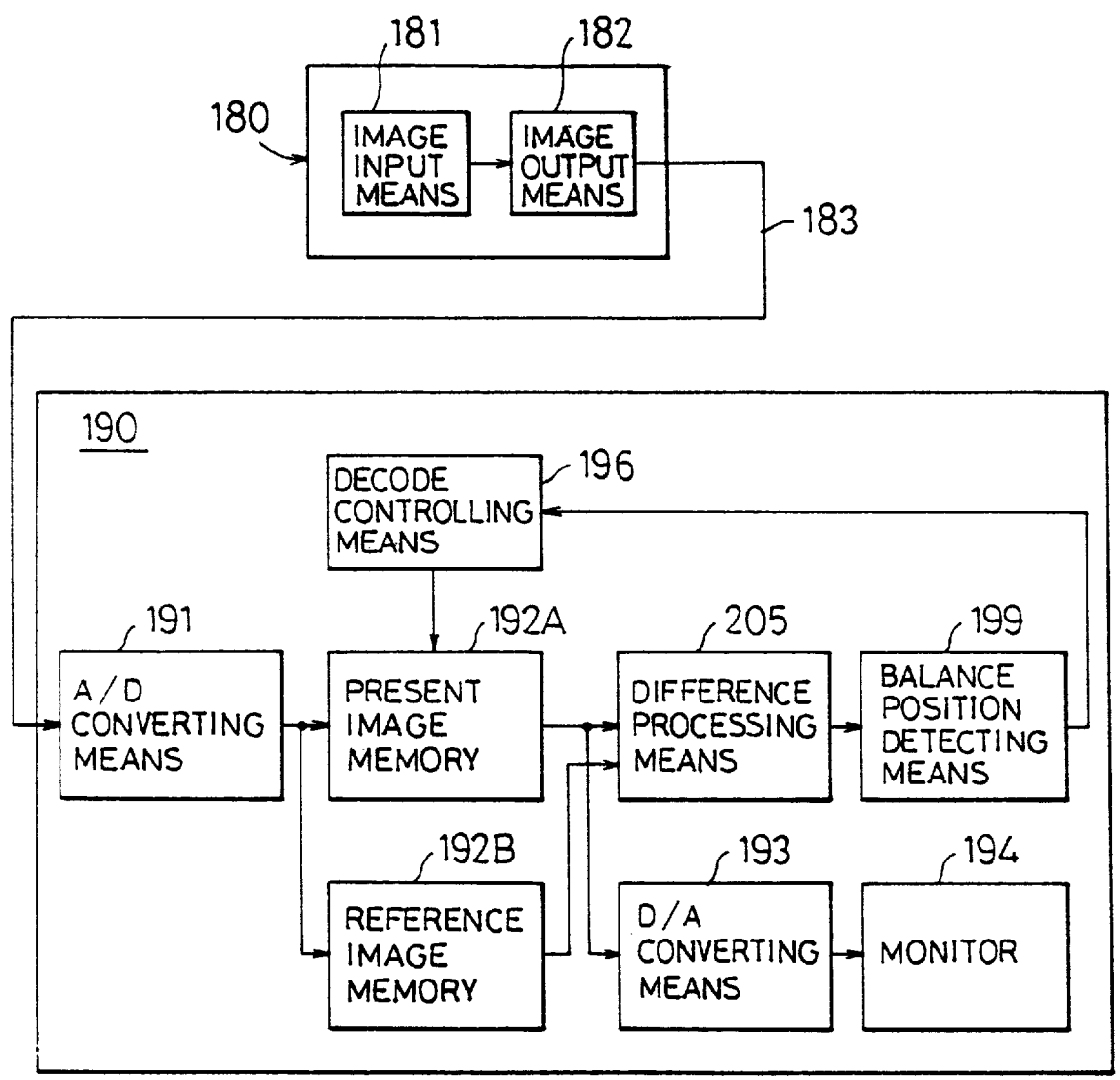
FIG. 19 is a block diagram showing another embodiment of the interphone according to the present invention.

In still another embodiment as shown in FIG. 19 of the interphone with television according to the present invention, the centroid of an area to be subjected to the scrolling is quickly obtained so as to simplify the scroll operation. More specifically, the image signal provided from the terminal device 180 are digitalized at the A/D converting means 191, and the digitalized image data are provided to a present image memory 192A and a reference image memory 192B. At the present image memory 192A, the data of the present image are stored temporarily, at the reference image memory 192B, the image data at the moment when the visitor has just entered in the monitoring zone. From these present and reference image memories 192A and 192B, their respective image data are provided to a difference processing means 205, where any difference between the both image data is determined, and a variation component in the present image is extracted. That is, the both data in the present and reference image memories 192A and 192B are simultaneously read out, and the variation component in the brightness due to the presence of the visitor in the monitoring zone is extracted. For this difference processing means 205, an adder may be employed and, while the difference value is the difference between the mutually corresponding picture elements in the reference and present images and is either of positive or negative value, it suffices the purpose to obtain the difference in the absolute value. The thus obtained difference value is provided to a balance or centroid position detecting means 199, where the centroid position of varied portion is obtained. Detecting output of this balance position detecting means 199 is sent to a read or decode controlling means 196 which transmits to the present image memory 192A a control signal for reading the present image so that a predetermined extent of mainly the image data of the centroid position will be displayed as magnified over the entirety of the monitor screen.

From the present image memory 192A, the present image data are provided not only to the difference processing means 205 but also to a D/A converting means 193 where the image data are converted into an analogue image signal which is provided to the monitor 194 to be displayed. At the balance position detecting means 199, more specifically, the centroid is obtained in both of the horizontal and vertical directions of the zone in which the visitor is present and extracted by subjecting the difference image provided from the difference processing means 205 to a predetermined binary coding. In obtaining such centroids, the horizontal and vertical directional addresses of the respective picture elements extracted are added accumulatively over the whole of the screen, and the sum is just divided by the picture element number. The thus obtained centroid position is to denote the centroid of the image of the visitor.

Figure 20A:
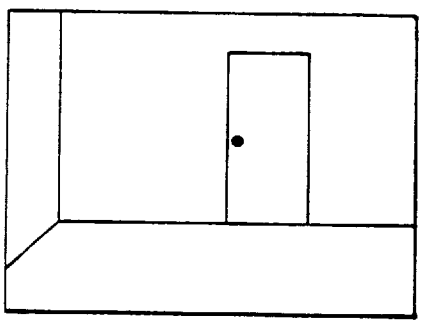
FIG. 20 is an explanatory view for the operation of the interphone shown in FIG. 19.
Figure 20B:
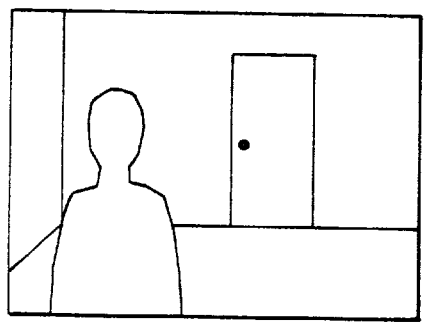
Figure 20C:
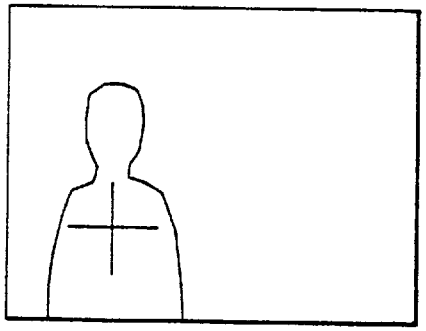
Figure 20D:
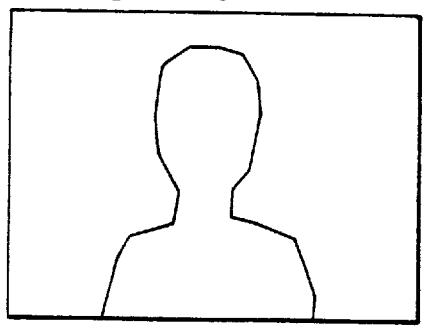

Referring next to the operation of the present embodiment, an image of the monitoring zone but in a state when no visitor is present, such as shown in FIG. 20a, is preliminarily stored in the reference image memory 192B as the reference image. Now, as the visitor appears, as shown in FIG. 20b, the difference between the present image and the reference image is determined by the difference processing means 205, and the position of the centroid G of the visitor is detected as shown in FIG. 20c by the balance position detecting means 199 from the difference image. On the basis of positional information of this centroid, the position of the centroid G is shifted to the center of the screen by the decode controlling means 196, and the read or decode control signal for the magnified display over the whole screen of the image data of the portion around the centroid G, that is, the image portion mainly of the visitor is provided to the present image memory 192A. The present image data read out in accordance with this decode control signal are converted into the image signal at the D/A converting means 193 and, thereafter, the visitor's image is displayed as magnified on the screen of the monitor 194 as shown in FIG. 20d.

In this embodiment of FIG. 19, all other arrangements and their functions are the same as those in the embodiment of FIG. 1, and the same constituents as those in the embodiment of FIG. 1 are denoted by the same reference numerals as those used in FIG. 1 but with 170 added thereto.

Figure 21:
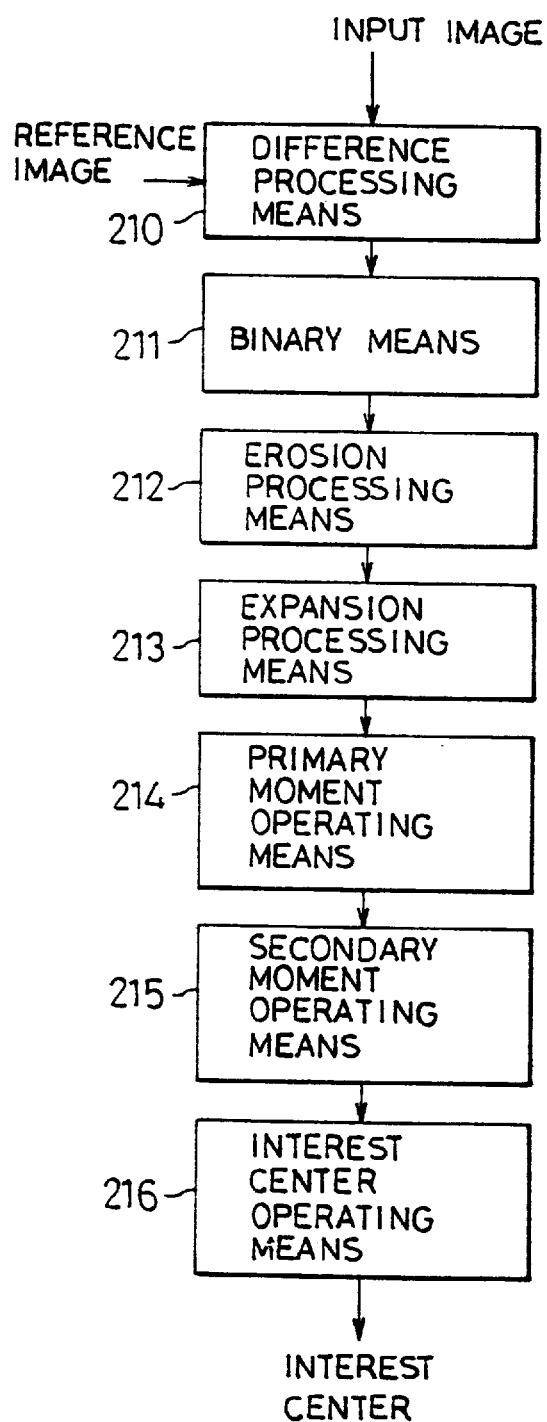
FIG. 21 is a block diagram showing still another embodiment of the interphone according to the present invention.
Figure 22:
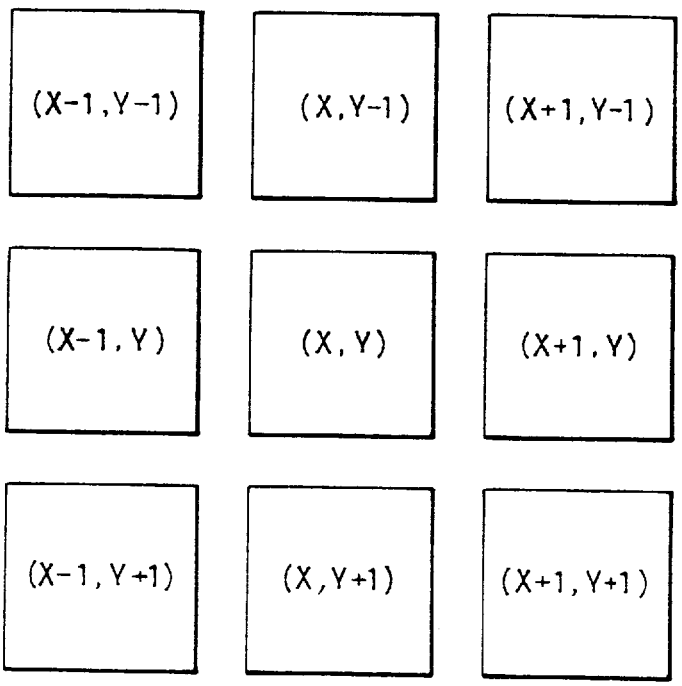
FIGS. 22 and 23 are explanatory views for the operation of the interphone shown in FIG. 21.

In a further embodiment of the interphone with television according to the present invention as shown in FIG. 21, an interest center of the subject area of the image is obtained, and a simplification of the scroll operation is attempted. More specifically, in the present embodiment, there is employed an image processing algorithm. That is, at the difference processing means 210, the difference image between the present image and the reference image is obtained with the same arrangement as that in the embodiment of FIG. 19, upon which the reference image R(X,Y) and present image I(X,Y) employ both a black and white image of 256 tones of 8 bits with respect to each coordinate, while the difference image D(X,Y) is formed with D(X,Y) =R(X,Y)−I(X,Y) obtained with respect to the coordinates (X,Y) and is represented as 8 bit digital data. At the next binary means 211, digital value of each picture element of the difference image D(X,Y) is compared with a predetermined threshold value and is converted into a binary image B(X,Y), the binarizing being made in such that a picture element of a large intensity difference between the present and reference pictures is made to be "1" while a picture element of a small intensity difference is made to be "0 " At an erosion processing means 212, next, any edge of the binary image B(X,Y) is shaved and an erosion processing is carried out in order that any small noise component is removed. While this erosion processing is a standard morphological filtering function and may be definable in many ways, it is defined here that the minimum value in 3 ×3 picture elements with respect to the picture element of the coordinates (X,Y) made as the center is determined to be the picture element of an erosion image E(X,Y). In other words, as shown in FIG. 22, the picture elements of nine coordinates are investigated with respect to the picture element of the coordinates (X,Y), the minimum value among which is determined to be the picture element of the erosion image E(X,Y) and, since the binary images are the subject in the present embodiment, the minimum value will be "0". That is, the erosion image E(X,Y) is made to be "1" only when all 3×3 picture elements including the center picture element (X,Y) are "1" but to be "0" when even a single picture element is "0". In this way, the edge of the binary image B(X,Y) is subjected to the erosion of about three picture elements but, instead, it is possible to remove any small noise component which involves even one "0" picture element in the area of 3×3 picture elements.

At a next expansion processing means 215, an expansion processing is carried out for restoring the binary image to be of the original size by expanding the noise-removed edge of the image. This expansion processing is also of a standard morphological filtering function, in which the maximum value in the 3×3 picture elements with the picture element of the coordinates (X,Y) made as the center is determined to be of a picture element of an expansion image G(X,Y), the respective picture elements of such nine coordinates as shown in FIG. 22 are investigated, and the maximum value among them is made to be the picture element of the expansion image G(X,Y), which maximum value will be "1" since in the present embodiment the binary image is the subject. That is, the expansion image G(X,Y) will be "0" only when all of the 3×3 picture elements including the center picture element (X,Y) are "0" but will be "1" when even one picture element is "1". In this way, the edge of the erosion image E(X,Y) is subjected to the expansion for about three picture elements, and the noise component which has been removed at the erosion processing is not removed here.

Next, at a primary moment operating means 214, the number N of the picture elements the value of which is "1" is counted with respect to the expansion image G(X,Y), and its primary moment is computed by means of a formula $$X1=(\Sigma Xi)/N, Y1=(\Sigma Yi)/N$$

wherein $\Sigma Xi$ is the grant sum of X coordinates of the respective coordinates (X,Y) of the picture element value "1" and $\Sigma Yi$ is the grant sum of Y coordinates also of the respective coordinates (X,Y) of the picture element value "1". Coordinates (X1,Y1) computed with the above formula are to be the balance or centroid position of the image where the picture element value at the expansion image G(X,Y) becomes "1". At a secondary moment operating means 215, next, a secondary moment from the centroid position (X1, Y2) of the picture elements the value of which becomes "1" is computed in respect of the expansion image G(X,Y) by means of a formula $$X2=\{\Sigma(Xi-X1)^2\}/N, Y2=\{\Sigma(Yi-Y1)^2\}/N$$

which is identical to a formula for computing the moment of inertia in the physics.

Finally at an interest center operating means 216, an interest center of the visitor's image is extracted from the primary and secondary moments by means of a formula $$X3=X1+\alpha X2, Y3=Y1+\alpha Y2$$

Figure 23:
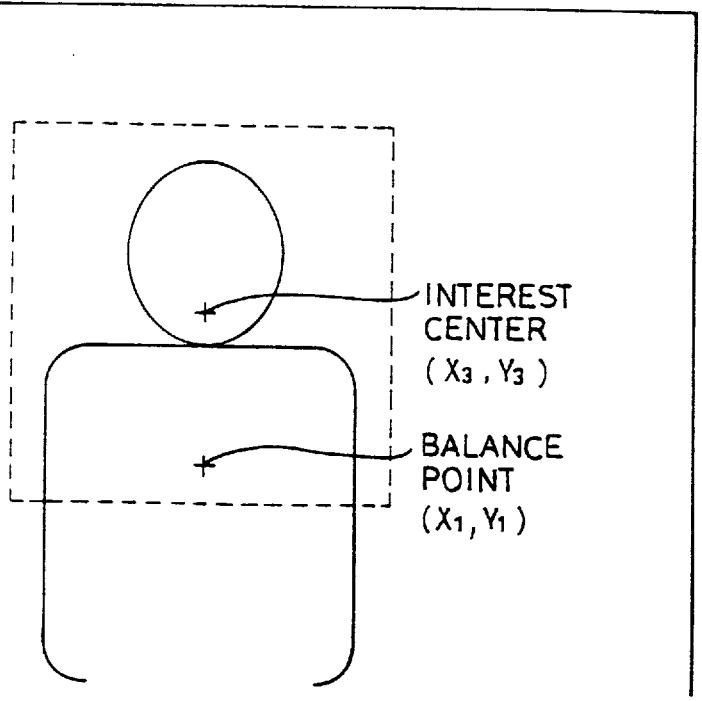

In this event, the visitor's image shows such horizontal symmetricity as shown in FIG. 23 and, in this formula, $\alpha=0$. In FIG. 23, (X1,Y1) denotes the absolute coordinates of the centroid of the visitor's image. On the other hand, the secondary moment (X2,Y2) is a relative distance, and a correction of 2·Y2 is given to the Y coordinate of the centroid so that (X1,Y1+2Y2) will be the coordinates (X3, Y3) of the interest center. the image is magnified with this interest center made as the center of the magnification, and such image portion as denoted by broken lines in FIG. 23, preferably an upper half body image of the visitor only, can be extracted.

Figure 25A:
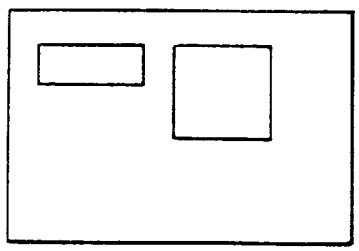
FIGS. 25 and 26 are explanatory views for the operation of the interphone shown in FIG. 24.
Figure 25B:
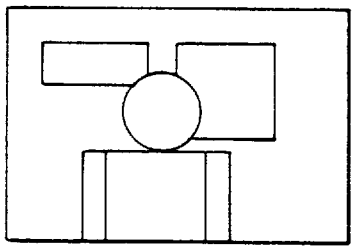
Figure 25C:
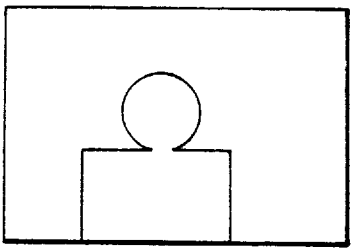
Figure 25D:
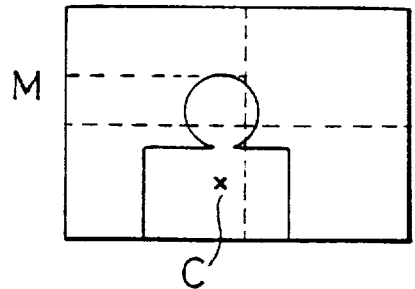
Figure 25E:
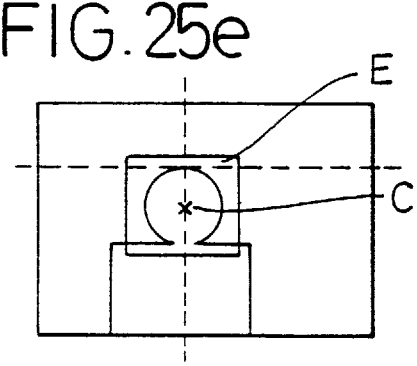
Figure 25F:
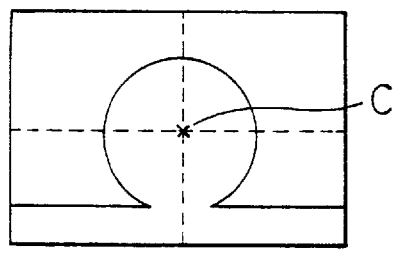

According to still another embodiment as shown in FIG. 24 of the interphone with television according to the present invention, there is provided an arrangement allowing the image of only a face portion of the visitor to be scrolled in smooth manner. More specifically, the terminal device 230 comprising the image input means 231 and image output means 232 provides the image signal to the master device 240 which comprises such A/D converting means 241, present image memory 242A, reference image memory 242B, difference processing means 255, binary means 249, D/A converting means 243, read or decode control means 246 and monitor 244 as those which have been substantially described with reference to the embodiment of FIG. 12 or 19 and which attain the same functions. In the present embodiment, on the other hand, such visitor's image as shown in FIG. 25c is extracted from the reference image of FIG. 25a and the present image of FIG. 25b and, thereafter, a peak portion and center detecting means 256 detects such visitor's image center C and peak portion M as shown in FIG. 25d. Further, a center-point of face detecting means 257 detects such center point C of the visitor's face as shown in FIG. 25e, the decode control means 246 renders the center point C to be positioned at the center of the monitor's screen on the basis of the information on this face center point C, and the image data is transmitted to the present image memory 242A in order that a limited zone E including substantially only the visitor's face as shown in FIG. 25f is displayed as magnified on the screen of the monitor 244. Further, in the present embodiment, there is provided a distance sensor 258 for sensing the distance between the image input means 231 of the terminal device and the visitor, and such distance data are provided to the center-point-of-face detecting means 257.

Figure 26:
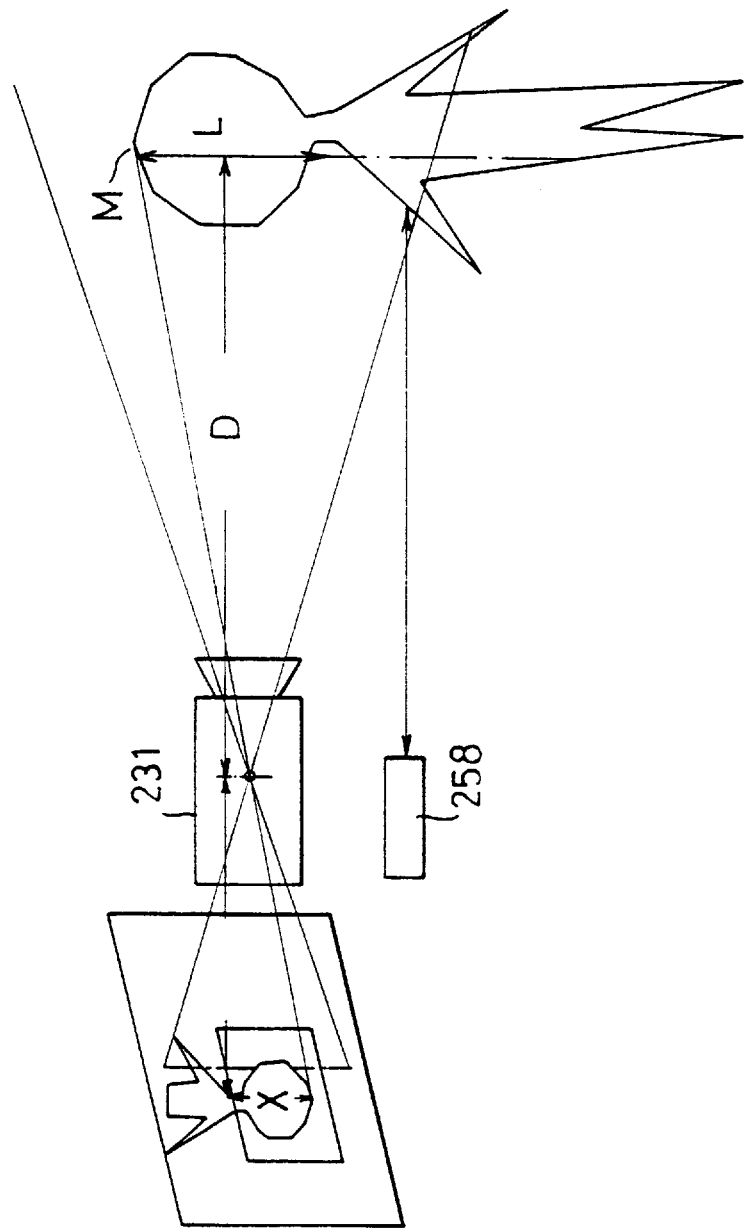

The center point of the visitor's face can be obtained as shown in FIG. 26 in practice with the size L of the visitor's face assumed to be 30 cm, for example, and on the basis of a face zone side X on the screen of the monitor 244 as computed by D/L of the distance D between the image input means 231 and the visitor as obtained by the distance sensor 258 as well as a focusing distance d of the image input means 231.

In the embodiment of FIG. 24, other arrangements and their functions are substantially the same as those in the embodiment of FIG. 12 or 19.

Figure 27:
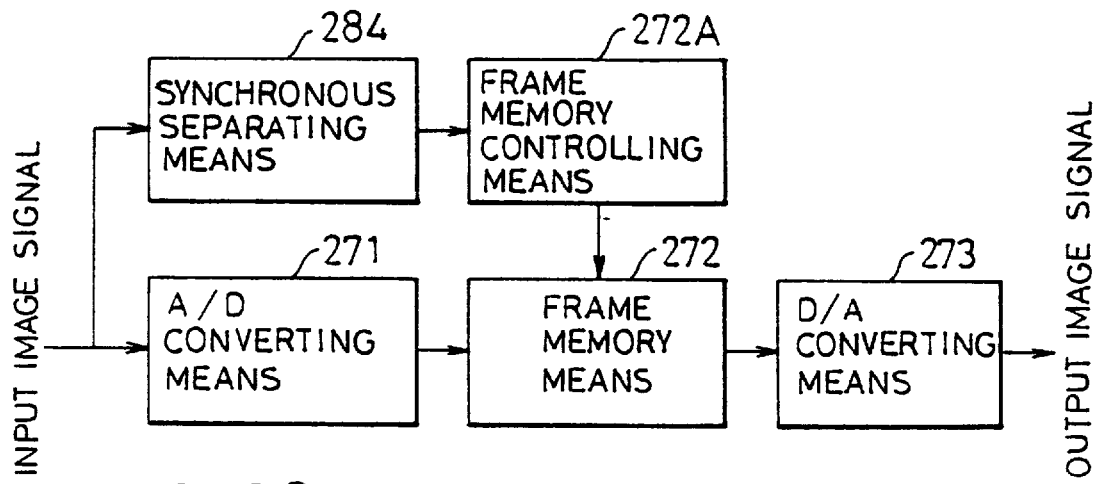
FIG. 27 is a partial block diagram of still another embodiment of the interphone according to the present invention.
Figure 28:
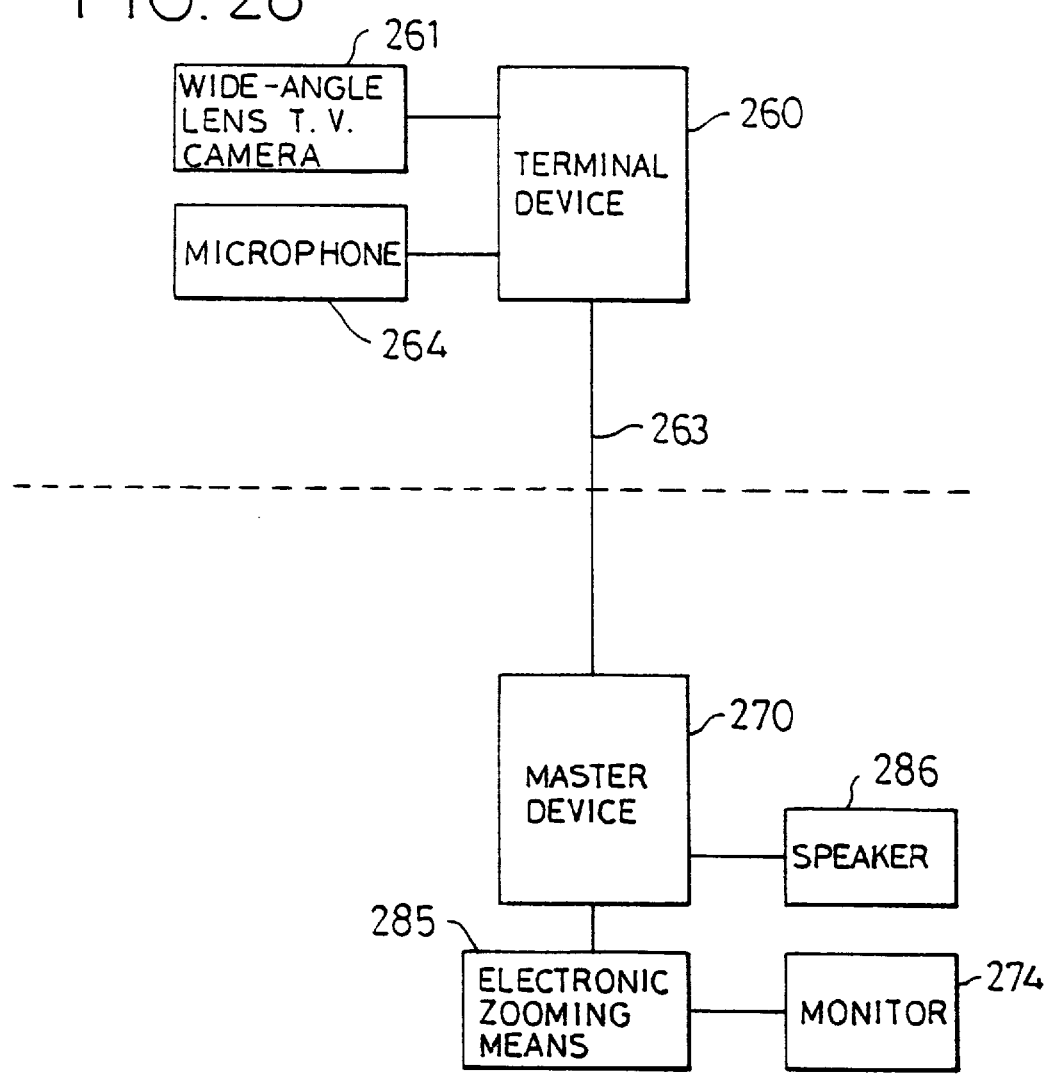
FIG. 28 is a partial block diagram of the interphone shown in FIG. 27.

In still another embodiment shown in FIGS. 27 and 28 of the interphone with television according to the present invention, there is taken a measure for avoiding any influence on the displayed image on the monitor of an abnormality in the scanning lines in executing an automatic scrolling at a real time mode with a standard field memory employed. Referring to the drawings, the image signal is provided from the terminal device 260 having a wide angle image input means 261 and preferably a microphone 264 through the transmission line 263 to the A/D converting means 271 and synchronous separating means 284 in the master device 270 which including an electronic zooming means, i.e., an automatic scrolling means 285, monitor 274 and preferably a speaker 286. Here, the image data digitalized at the A/D converting means 271 are input into a frame memory means 272 while a synchronous signal is input from the synchronous separating means 284 into a frame memory controlling means 272A. For the frame memory 272, a standard frame memory in employed, the interior of which is divided into two sections assigned respectively to odd and even fields, and the writing and reading are realized in parallel during receipt of outputs from the frame memory control means 272A. The image data read out of the frame memory 272 are again converted into the analogue signal through the D/A converting means 273 and provided to the monitor 274 in an optimumly scrolled mode to be reproduced.

Figure 29A:
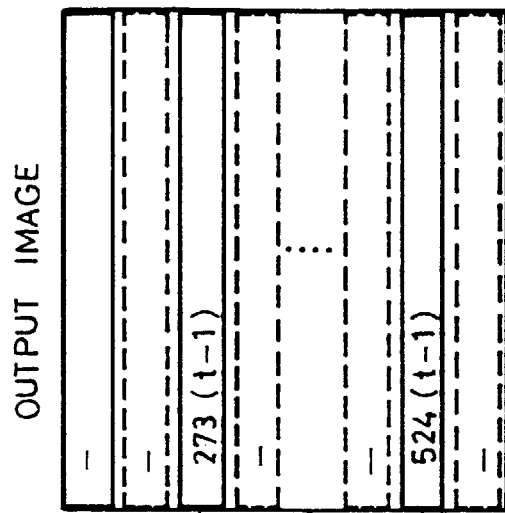
Figure 29B:
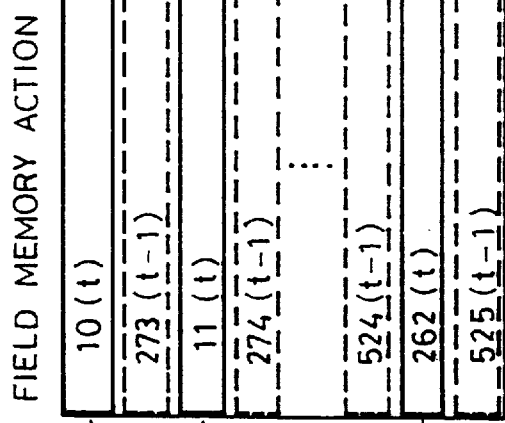
Figure 29C:
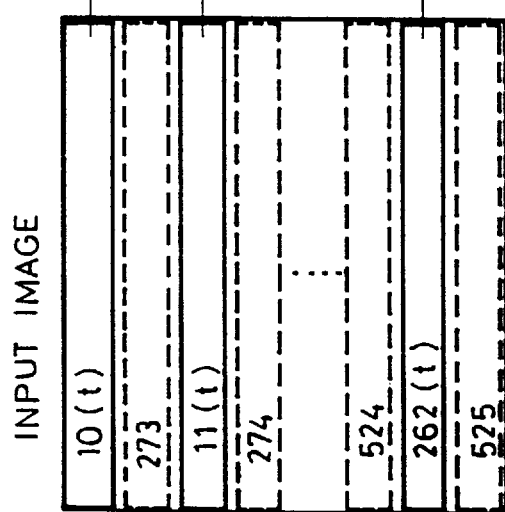

Referring more specifically to the automatic scrolling operation in the present embodiment, a field unit processing of reading previous image data of an earlier field is carried out. In the odd field, first, the data in the odd field are housed in corresponding lines in the corresponding field memory as shown in FIGS. 29a and 29b, during which the data housed in the even field during the previous field are read out. At this time, the frame memory control means 272A reads the data in the even field as delayed by one line. That is, as will be clear when FIGS. 30a to 30c are referred to, the read operation is not started but made to wait at a timing of a 10th scanning line, and the data in 273rd even field are read out at a timing of 11th scanning line. By reading the data in such 1 line delay mode, no reading of the last 525th scanning line is carried out, whereby the line position in the monitor 274 is caused to be shifted 1 line below as a whole. In this field, no image data are output to the initial line but, when data "0" are inserted in this line, a black level is attained on the screen of the monitor 274 so that there will occur no problem since the monitor 274 is normally overscanned and it often happens that any portion closer to the boundary of the monitor 274 is not displayed and, even if displayed, the display is at the black level in the same manner as in the case of blanking. For the next operation of the even field, such special timing alteration as in the odd field is not performed, and the output image which has been composed through such scanning are made to be equal to a normal arrangement of the scanning lines, and the image reproduced on the monitor 274 is also made normal as shown in FIG. 31.

In the present embodiment, therefore, the reading timing for the odd field is subjected merely to the deviation by one line only, so that the reproduction of the image data can be realized easily by the use of the frame memory control means 272A, without involving any remarkable increment in costs. At this time, the automatic scrolling process may be realized only by writing scroll zone upon writing into the frame memory 272 and reading the zone in respect of the whole of the screen of the monitor 274, and it is made sufficient to carry out the scanning sequence of the scanning lines of the odd and even fields, whereby the automatic scroll operation can be made realizable with the single field memory, as will be readily appreciated.

In a further embodiment as shown in FIG. 32 of the interphone with television according to the present invention, the input image signal from the terminal device is provided to both of the A/D converting means 291 and synchronous separating means 304. The image data digitalized at the A/D converting means 291 are once stored in the frame memory 310 and are then input into a position detecting means 212 together with the image data for a next frame, where a typical position of varied zone in the image data is computed. For the typical position, it will be possible to employ the centroid or the like of the varied zone. The digital image data from the A/D converting means 291 are also stored in a frame memory means 311 included in a magnified display means, and the image data of the visitor's face portion, for example, are provided to the D/A converting means 293 in response to a read position command from the read or decode controlling means 313 also included in the magnified display means, to be displayed as magnified by the monitor. At this time, a command is given from a display position removing means 314 to the decode controlling means 313 so that the extraction of the face portion can be exactly commanded. While in this case the display position removing means 314 can be arranged for performing the automatic scrolling operation, it is also possible to arrange the device for the manual scrolling operation with such manual cursor display controlling means as has been described with reference to FIG. 1, and it is also desirable that the arrangement is so made as to initially carry out the manual scrolling by the manual cursor display controlling means and thereafter to execute the accurate display position setting automatically, that is, to carry out manually a cursory position setting and then to execute automatically a precise position setting.

In the embodiment of FIG. 32, all other arrangements and their functions are the same as those in the respective foregoing embodiments, and, in carrying out the magnified display in the present embodiment, such interpolation as has been described with reference to the embodiment of FIG. 12 may also be employed.

Figure 33:
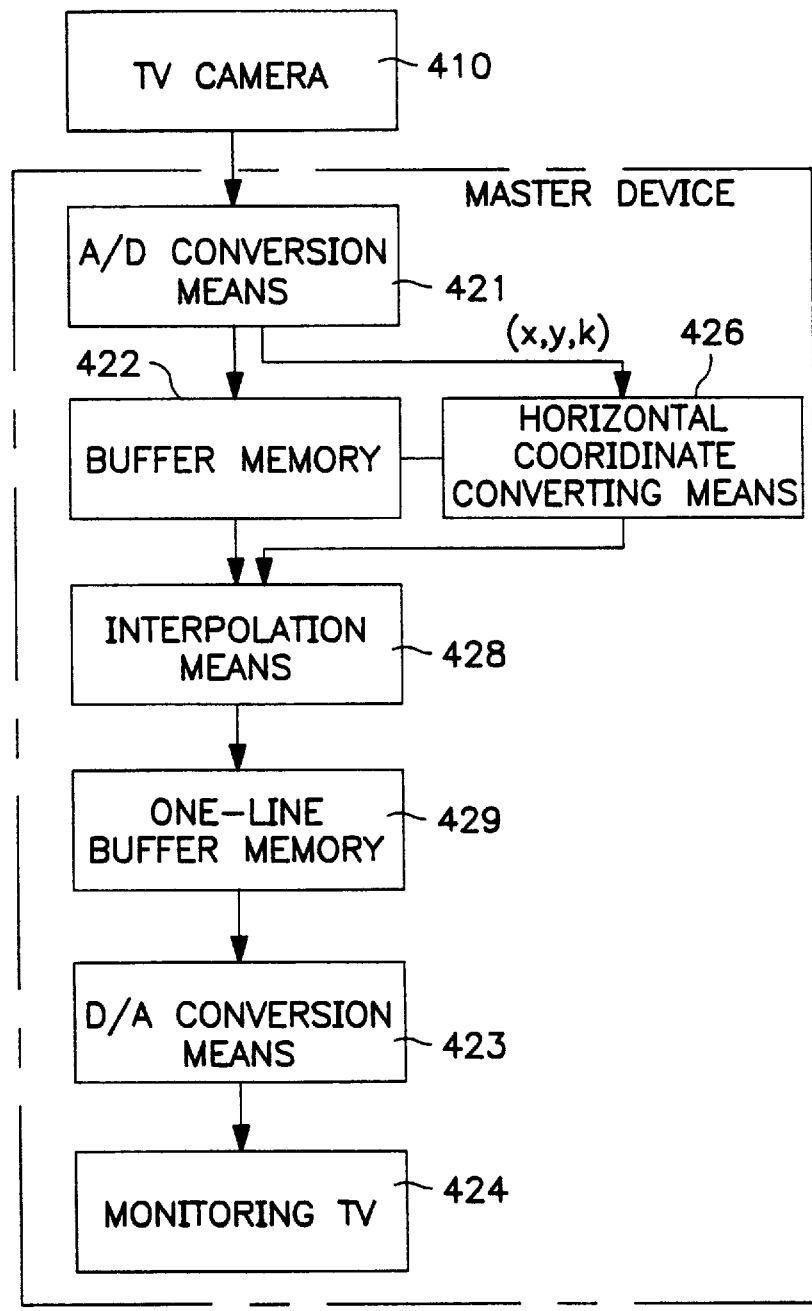
FIG. 33 shows a further embodiment of the interphone specially adapted for correcting image distortions in the horizontal direction.

In a further embodiment shown in FIG. 33, the interphone with a television according to the present invention produces the real-time moving image with distortion of the image due to the wide-angle lens of the monitoring camera corrected only in the horizontal direction. Therefore, the interphone can be significantly minimized in size and manufacturing costs while reproducing a wide-angle image that is still clear enough for recognizing the visitor.

For this purpose, the correction of distortion in the image only in the horizontal direction is achieved by disregarding the picture elements at both ends of each horizontal line of the digitized image signal during data processing for correcting the data, because only the picture elements at the ends of the horizontal line data are significantly distorted by the wideangle lens, and producing data for disregarded picture elements at both ends through interpolation of the remaining picture elements between the ends of the horizontal line.

Figure 34:
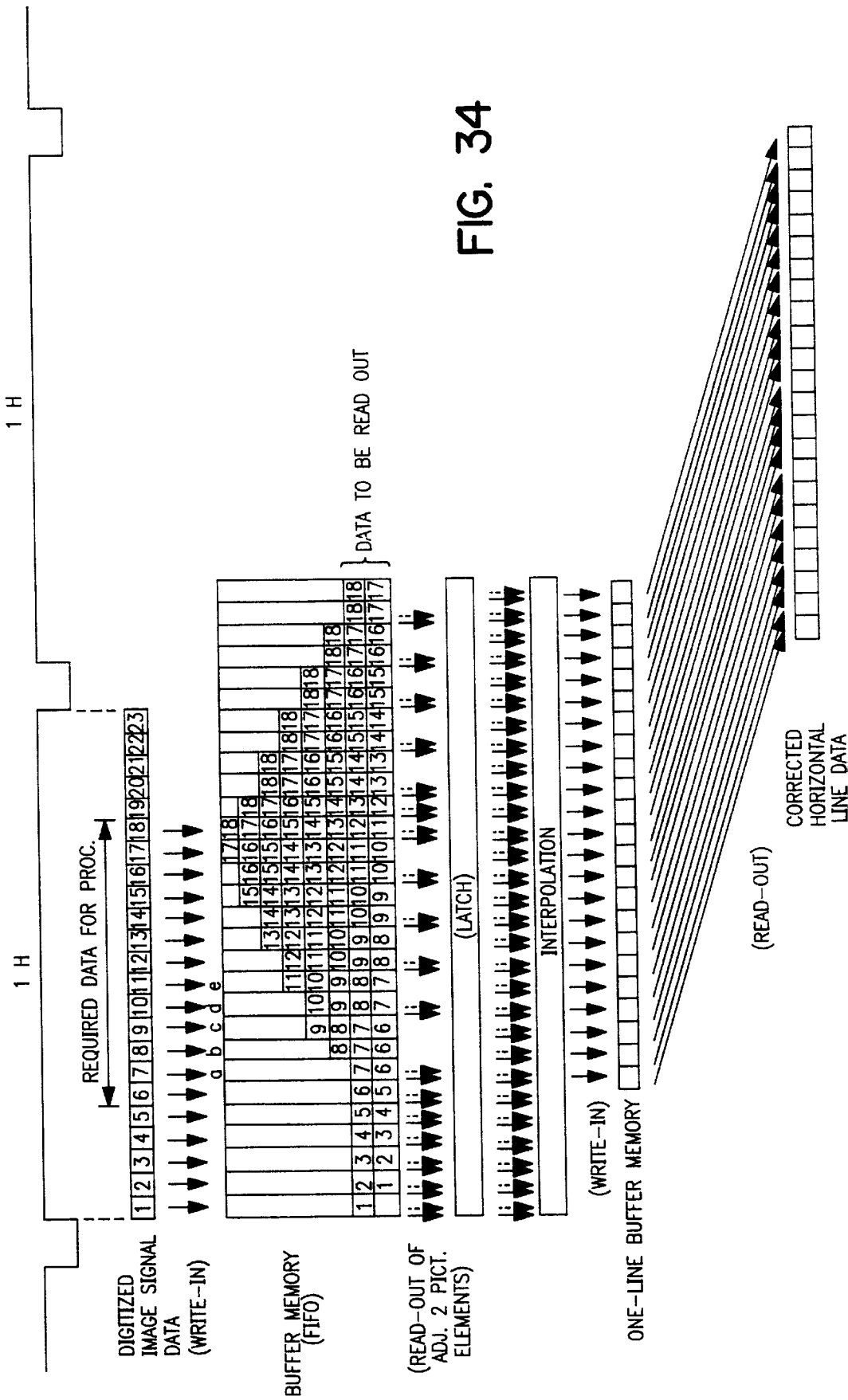
FIG. 34 shows a data flow for the embodiment shown in FIG. 33.

FIG. 33 is a block diagram of an embodiment of the invention and FIG. 34 shows a data flow in the horizontal line distortion correction process in which the digitized image signal for one horizontal line includes 23 picture elements that are provided from an analog-to-digital conversion means 421 and stored in a buffer memory 422. The buffer memory 422 comprises an FIFO (first in first out) memory for placing the input image signal data in a waiting state by absorbing a time difference between the input image signal data and the distortion corrected data for one horizontal line, allowing the first two data to be simultaneously read out. (An ordinary FIFO memory outputs only the topmost data item.) In a horizontal coordinate converting means 426, the digitized image signal data are subjected to coordinate conversion by means of distortion corrected coordinates x and y and a parameter k, a known coefficient of distortion of the particular wide-angle lens used in the television camera 410 in the terminal device. A necessary horizontal coordinate D(x) is output for the correction of distortion through an interpolation means 428. The distortion corrected data for one horizontal line are stored in a one line buffer memory 429 and are read out when the next line is reached.

The barrel-shaped distortion of the image monitored with the wide-angle lens is more significant in the horizontal lines of data closer to the vertical edges of the picture. As the number of disregarded picture elements becomes larger, the number of interpolated picture elements with the same processed data increases. In the present embodiment, the first 5 picture elements and the last 5 picture elements, among 23 picture elements, of each horizontal line are disregarded. Accordingly, the first 5 picture elements are disregarded in the sequence of input, and the 6th (a-th row in the buffer of FIG. 34) and following picture elements are read out as the data to be processed. Thus, the FIFO memory causes the 6th and 7th picture elements to be read out first, they are interpolated in the interpolation means 428, and they are written in the one-line buffer memory 429. Next, two picture elements (b-th and c-th rows) are interpolated with the same data of the 6th and 7th picture elements and read out. The buffer memory 422 is stopped during this interpolation. Since the image signal data are input during this period, however, the following picture elements, such as 8th and 9th picture elements, are sequentially stored in the buffer memory in the present embodiment. At the d-th row, the data of 7th and 8th picture elements are used and the buffer memory outputs a single data item while simultaneously storing the 9th picture element. The same operation is repeated until the last, i.e., the 18th, picture element of the picture elements to be processed is input into the buffer memory, increasing the data stored in that memory. After the 18th picture element, the picture elements are disregarded and the writing in of data into the buffer memory is interrupted. Only reading out of data from the buffer memory is permitted so that the data stored in the buffer memory are sequentially reduced. Since the 17th and 18th picture elements of the line containing the 23 picture elements are subjected to interpolation, when the last 5 picture elements that are disregarded are reached, the data for the one horizontal line from the 6th to the 18th picture elements are all output to the one line buffer memory 429. These data are read out at a predetermined time upon reaching the next line. Thus, the vertical position is moved downward by one line, but this movement has no significant influence on the appearance or visibility of the entire image.

What is claimed is:

1. An interphone with a television comprising:
   a terminal device including wide-angle lens means for monitoring a visitor at an entrance, means for generating a real-time moving image covering an image area monitored, and output means for outputting an image signal including a plurality of horizontal lines carrying the real-time moving image; and a master device interconnected with the terminal device and including analog-to-digital converting means receiving the image signal from the output means of the terminal device for converting the image signal into a digitized image signal including a plurality of horizontal lines, each line including a plurality of picture elements, distortion correcting means for digitally correcting distortion only in the picture elements of each horizontal line of the digitized image signal due to the wide-angle lens means, the distortion correcting means including buffer memory means receiving and storing respective picture elements for a horizontal line of the digitized image signal from the analog-to-digital converting means, interpolation means for processing sequentially the respective picture elements for the horizontal line, except for the picture elements at beginning and terminating ends of the line, interpolating the picture elements between both ends, thereby producing an interpolated picture element for each picture element in the horizontal line, and one-line buffer memory means receiving and storing the interpolated picture element, digital-to-analog converting means receiving from the one-line buffer memory means the corrected horizontal line data and from the analog-to-digital converting means vertical line data of the image signal for producing a corrected analog image signal, a monitor receiving the corrected analog image signal and reproducing the real-time moving image, and scroll means coupled to the analog-to-digital converting means and the distortion correcting means for scrolling the real-time moving image on the monitor.

2. A method of correcting distortion in a wide-angle real-time moving image generated by a wide-angle lens comprising digitally correcting the wide-angle real-time moving image only along a horizontal axis by interpolating, sequentially, respective picture elements between picture elements of a horizontal line except for the picture elements at beginning and terminating ends of the horizontal line, in accordance with a known coefficient of distortion of the wide-angle lens to produce replacement picture elements for each picture element in the horizontal line.

* * * * *